US012694396B2

(12) United States Patent
Yu et al.

(10) Patent No.: US 12,694,396 B2
(45) Date of Patent: Jul. 28, 2026

(54) SYSTEMS AND METHODS FOR BLOCKCHAIN DISTRIBUTED LEDGER-BASED TRANSACTIONS USING UTXO MERKLE TREE DATA STRUCTURES

(71) Applicant: HSBC Software Development (Guangdong) Limited, Guangdong (CN)

(72) Inventors: Shihang Yu, Guangzhou (CN); Ruxin Hou, Shanghai (CN); Wei Ming Zhuang, Shanghai (CN); Yuan Li, Guangzhou (CN); Shiqian Zhong, Guangzhou (CN)

(73) Assignee: HSBC Software Development (Guangdong) Limited, Guangdong (CN)

( * ) Notice: Subject to any disclaimer, the term of this patent is extended or adjusted under 35 U.S.C. 154(b) by 0 days.

(21) Appl. No.: 19/425,253

(22) Filed: Dec. 18, 2025

(65) Prior Publication Data

US 2026/0111876 A1     Apr. 23, 2026

(30) Foreign Application Priority Data

Dec. 30, 2024     (CN) .......................... 202411977505.3

(51) Int. Cl.
G06Q 20/36         (2012.01)
G06Q 20/38         (2012.01)
(52) U.S. Cl.
CPC ......... G06Q 20/367 (2013.01); G06Q 20/389 (2013.01)

(58) Field of Classification Search
None
See application file for complete search history.

(56)         References Cited

U.S. PATENT DOCUMENTS

| | | | | |
|---|---|---|---|---|
| 10,579,974 B1 * | 3/2020 | Reed | .................... | G06Q 20/065 |
| 11,978,049 B1 * | 5/2024 | Bechar | ................. | G06Q 20/389 |
| 2020/0051077 A1 * | 2/2020 | Ma | ........................ | G06Q 20/065 |
| 2020/0059362 A1 * | 2/2020 | Brody | .................... | H04L 9/3242 |
| 2020/0328893 A1 * | 10/2020 | Westland | .............. | H04L 63/123 |
| 2020/0349283 A1 * | 11/2020 | Saket | .................. | G06F 21/6254 |
| 2020/0379977 A1 * | 12/2020 | Saket | .................... | H04L 9/3218 |

(Continued)

FOREIGN PATENT DOCUMENTS

| | | | | | |
|---|---|---|---|---|---|
| WO | WO-2023073105 A1 * | 5/2023 | ........... | G06Q 20/389 |
| WO | WO-2023214152 A1 * | 11/2023 | ......... | G06Q 20/3825 |

*Primary Examiner* — Jahed Ali
(74) *Attorney, Agent, or Firm* — Dentons Durham Jones Pinegar

(57)         ABSTRACT

An improved computational privacy based approach is proposed to allow for a blockchain privacy enabled transaction protocol for processing distributed ledger transactions of a specially configured blockchain smart contract, the approach describing a cryptographic process, along with a corresponding apparatus and computer program products using a pair of specialized UTXO merkle tree data structures, authentication nullifiers based on zero-knowledge proofs and sets of public-private key pairs. The process includes storing a transaction amount as UTXOs into a first merkle tree data structure and confirming the transaction by claiming ownership using private tokens over the UTXOs in the first merkle tree data structure and moving the UTXOs to a second merkle tree data structure for redemption.

20 Claims, 11 Drawing Sheets

(56)          References Cited

U.S. PATENT DOCUMENTS

| | | | |
|---|---|---|---|
| 2020/0394620 A1* | 12/2020 | Kim | G06Q 20/02 |
| 2023/0131813 A1* | 4/2023 | Goel | H04L 9/3247 |
| | | | 705/75 |
| 2024/0013213 A1* | 1/2024 | Trock | G06Q 20/401 |
| 2024/0261692 A1* | 8/2024 | Sliwka | H04L 9/3213 |
| 2024/0265373 A1* | 8/2024 | Tomescu | G06Q 20/3678 |
| 2024/0380619 A1* | 11/2024 | Ho | H04L 9/50 |
| 2024/0386425 A1* | 11/2024 | De Caro | G06Q 20/02 |
| 2025/0350470 A1* | 11/2025 | Kovach | G06K 19/06187 |
| 2025/0390864 A1* | 12/2025 | Wilder | G06Q 20/3678 |

* cited by examiner

SYSTEMS AND METHODS FOR BLOCKCHAIN DISTRIBUTED LEDGER-BASED TRANSACTIONS USING UTXO MERKLE TREE DATA STRUCTURES

CROSS-REFERENCE TO RELATED APPLICATIONS

This application claims priority to Chinese Patent Application No. 202411977505.3 filed on Dec. 30, 2024, the entire disclosure of which is hereby incorporated by reference in its entirety.

FIELD

The present application relates to computer architecture and inter-process encrypted data communications and more specifically, to systems and methods for using encryption for selective obfuscation of distributed ledger transactions.

INTRODUCTION

A technical challenge with decentralized blockchain transactions is that the recordal process creates an immutable record that is traversable by third parties to identify a sender wallet address, a receiver wallet address, and a field corresponding to the amount being transferred. This privacy issue is a result of the technical characteristics and architecture of the transaction propagation and consensus mechanism of a blockchain as distributed ledgers are updated with block updates.

As a result, in current blockchain architecture, transactions are not private. It is desired to have a blockchain transaction protocol that provides enhanced privacy for each transaction such that a third party cannot view or access details of the transaction (e.g., parties involved, amount of the transaction, etc.)

Furthermore, there are several technical challenges in existing privacy enabled transaction (PET) protocols. Some PET protocols utilize capabilities of blockchain but do not support smart contracts, which hinders business scalability and implementation Account-based management of account balances poses concurrency issues due to hidden transaction amounts in PET. As account balances continuously change, zero-knowledge proofs generated previously based on current balances become invalid. Implementation of zero-knowledge proofs is also too complex, which results in high verification costs and excessive gas fees for transactions.

Some protocols use an unspent transaction output (UTXO) model, but the architecture design is often too complicated on the client-side. For example, the client-side often needs to maintain merkle tree proofs consistent with the contract state and attempt to decrypt every transaction in the system. It may even require knowledge of the public keys of any potential participant who may have conducted a transfer transaction to the client. Because participants and amounts of each transfer are encrypted/hidden, if the recipient can't know that some sender has transferred tokens to them, the funds will never be extracted. There is a lack of support for non-repudiation capabilities without third party intervention in current systems.

SUMMARY

An improved computational privacy based approach is proposed to allow for a blockchain privacy enabled transaction protocol for processing distributed ledger transactions of a specially configured blockchain smart contract, the approach describing a cryptographic process, along with a corresponding apparatus and computer program products using a pair of specialized UTXO merkle tree data structures, authentication nullifiers based on zero-knowledge proofs and sets of public-private key pairs. The process includes storing a transaction amount as UTXOs into a first merkle tree data structure (i.e., the pending UTXO merkle tree) and confirming the transaction by claiming ownership using private tokens over the UTXOs in the first merkle tree data structure and moving the UTXOs to a second merkle tree data structure (i.e., the confirmed UTXO merkle tree) for redemption.

Merkle trees are data structures in which every "leaf" node is labelled with a cryptographic hash of a data block, and every node that is not a leaf (i.e., a branch) is labelled with the cryptographic hash of the labels of its child nodes. Merkle tree data structures allow for efficient and secure verification of the contents of large data structures and can help ensure that data blocks received from other entities in a network are received undamaged and unaltered.

In this approach, both the sender and receiver of the funds in question can claim ownership of a UTXO from the pending and confirmed UTXO merkle trees, ensuring that UTXOs will not be lost during transactions or wallet client recovery. By storing pending UTXOs in the pending merkle tree and the confirmed UTXOs in the confirmed UTXO merkle tree, information in the private tokens can be decrypted using only the private key of either the sender or the receiver, without requiring the public key of the sender. This guarantees that UTXOs in the confirmed UTXO merkle tree will not be left unclaimed. Merkle tree proof generation can be provided from the merkle trees via public functions of the proposed smart contract such that clients do not need to maintain a whole mirror image of the UTXO merkle trees to be the same as the merkle trees on the smart contract.

The process of moving UTXOs from the pending merkle tree to the confirmed merkle tree can be clearly recorded and distinguished by the proposed smart contract as being initiated by either the sender or the receiver, without the need for third-party assistance. This allows for clear resolution of any potential transaction issues. This approach utilizes smart contracts to enable business expansion and scalability. The smart contracts require different ZKP verification logic when validating the sender compared to the receiver, and this difference in validation method will also be recorded in the transaction data.

Moving UTXOs from the pending merkle tree to the confirmed merkle tree utilizes a zero-knowledge proof approach to authorizing a transaction. When a receiver wishes to extract and generate a new confirmed UTXO from the pending UTXO in the pending merkle tree, the receiver can generate a pending authentication nullifier using a hash function. The pending authentication nullifier has a relationship with the pending UTXO, but the relationship is not identifiable through the hash values. Thus, a ZKP can be used to verify the receiver has provided correct inputs without revealing or needing to know the actual input values. Other entities can attempt to validate the ZKP logic, but only the receiver will have the correct pending nullifier to provide as input.

The proposed approach uses the Circom programming language to implement logically clear and simple zero-knowledge proof circuits and can automatically generate verification code on the contract side. Employing UTXOs effectively eliminates the concept of total balance and facilitates the resolution of concurrency issues. The approach also ensures that UTXOs will not be left stuck or unclaimed as the sender can always retrieve or extract the UTXOs.

The use of a pending UTXO merkle tree is key to the approach proposed herein. The pending UTXO merkle tree sets the conditions and time limits for unlocking funds, ensuring that only the recipient who provides the correct unlocking information (e.g., their own private key) can access the transferred funds.

Embodiments described herein provide a computing system for processing private blockchain distributed ledger based transactions using two UTXO merkle tree data structures. The system includes a computer processor coupled with computer memory and a non-transitory computer readable storage medium. The computer processor is configured to persist a smart contract data object comprising a pending UTXO merkle tree data structure and a confirmed UTXO merkle tree data structure. The computer processor is configured to receive a plurality of tokens from a sender blockchain wallet to be sent to a receiver blockchain wallet; generate and insert a first plurality of confirmed UTXOs corresponding to the plurality of tokens into the confirmed UTXO merkle tree data structure; receive a transfer request from the sender blockchain wallet to transfer the plurality of tokens to the receiver blockchain wallet; and verify the transfer request and the sender blockchain wallet using a first confirmed nullifier. Upon successful verification of the transfer request, the computer processor is configured to generate and insert a plurality of pending UTXOs into the pending UTXO merkle tree data structure, record the first confirmed nullifier in the smart contract data object, and burn the first plurality of confirmed UTXOs from the confirmed UTXO merkle tree data structure, where the plurality of pending UTXOs are encrypted using public keys associated with the sender blockchain wallet and the receiver blockchain wallet. The computer processor is configured to then receive an extraction request from an owner to extract the plurality of pending UTXOs, where the owner is one of the sender blockchain wallet and the receiver blockchain wallet; and verify the extraction request and the owner using a pending nullifier. Upon successful verification of the extraction request, the computer processor is configured to extract the plurality of pending UTXOs from the pending UTXO merkle tree data structure, generate a second plurality of confirmed UTXOs in the confirmed UTXO merkle tree data structure, and record the pending nullifier in the smart contract data object. The computer processor is configured to then receive a withdrawal request from the owner to withdraw the plurality of tokens; verify the withdrawal request using a second confirmed nullifier. Upon successful verification of the withdrawal request, the computer processor is configured to transmit the plurality of tokens to the owner, record the second confirmed nullifier in the smart contract data object and burn the second plurality of confirmed UTXOs from the confirmed UTXO merkle tree data structure.

In some embodiments, the computer processor generates the pending nullifier using a hash function of a pending nonce, an Elliptic-curve Diffie-Hellman (ECDH) shared secret, and the value of the plurality of tokens.

In some embodiments, the computer processor generates the first and second confirmed nullifiers using a hash function of a confirmed nonce, a private key of the owner, and the value of the plurality of tokens.

In some embodiments, the computer processor verifies the transfer request using zero-knowledge proof and a Circom circuit to prove that the first plurality of confirmed UTXOs exist in the confirmed UTXO merkle tree data structure, the first confirmed nullifier is mapped to the first plurality of confirmed UTXOs, the first confirmed nullifier has not been recorded in the smart contract data object, the plurality of pending UTXOs do not exist in the pending UTXO merkle tree data structure, and the first plurality of confirmed UTXOs and the plurality of pending UTXOs correspond to the same token value.

In some embodiments, the computer processor verifies the extraction request using zero-knowledge proof and a Circom circuit to prove that the plurality of pending UTXOs exist in the pending UTXO merkle tree data structure, the pending nullifier is mapped to the plurality of pending UTXOs, the pending nullifier has not been recorded in the smart contract data object, the second plurality of confirmed UTXOs do not exist in the confirmed UTXO merkle tree data structure, and the plurality of pending UTXOs and the second plurality of confirmed UTXOs correspond to the same token value.

In some embodiments, the computer processor verifies the withdrawal request using zero-knowledge proof and a Circom circuit to prove that the second plurality of confirmed UTXOs exist in the confirmed UTXO merkle tree data structure, the second confirmed nullifier is mapped to the second plurality of confirmed UTXOs, and the second confirmed nullifier has not been recorded in the smart contract data object, In some embodiments, the smart contract data object further comprises an event bus that can be queried by the receiver blockchain wallet to check for pending UTXOs in the pending UTXO merkle tree data structure that are assigned to the receiver blockchain wallet.

In some embodiments, the computer processor is further configured to set an expiration time limit, and, upon the expiration time limit lapsing, automatically extract the plurality of pending UTXOs from the pending UTXO merkle tree data structure and return the plurality of tokens to the sender blockchain wallet, where the plurality of pending UTXOs have not been extracted within the expiration time limit.

In some embodiments, the receiver blockchain wallet is a custodial wallet that can be accessed by a plurality of entities to extract and consume the plurality of pending UTXOs in the pending UTXO merkle tree data structure and the second plurality of confirmed UTXOs in the confirmed UTXO merkle tree data structure, where the plurality of entities can simultaneously access the custodial wallet through access control.

In some embodiments, the computer processor is further configured to, upon successful verification of the transfer request, generate a UTXO designated for the sender blockchain wallet as change.

In an aspect, embodiments described herein provide a computing method for processing private blockchain distributed ledger based transactions using two UTXO merkle tree data structures. The method involves persisting a smart contract data object comprising a pending UTXO merkle tree data structure and a confirmed UTXO merkle tree data structure. The method involves receiving a plurality of tokens from a sender blockchain wallet to be sent to a receiver blockchain wallet; generating and inserting a first plurality of confirmed UTXOs corresponding to the plurality of tokens into the confirmed UTXO merkle tree data structure; receiving a transfer request from the sender blockchain wallet to transfer the plurality of tokens to the receiver blockchain wallet; and verifying the transfer request and the sender blockchain wallet using a first confirmed nullifier. Upon successful verification of the transfer request, the method involves generating and inserting a plurality of pending UTXOs into the pending UTXO merkle tree data structure, recording the first confirmed nullifier in the smart contract data object, and burning the first plurality of confirmed UTXOs from the confirmed UTXO merkle tree data structure, where the plurality of pending UTXOs are encrypted using public keys associated with the sender blockchain wallet and the receiver blockchain wallet. The method further involves receiving an extraction request from an owner to extract the plurality of pending UTXOs, where the owner is one of the sender blockchain wallet and the receiver blockchain wallet, and verifying the extraction request and the owner using a pending nullifier. Upon successful verification of the extraction request, the method involves extracting the plurality of pending UTXOs from the pending UTXO merkle tree data structure, generating a second plurality of confirmed UTXOs in the confirmed UTXO merkle tree data structure, and recording the pending nullifier in the smart contract data object. The method further involves receiving a withdrawal request from the owner to withdraw the plurality of tokens and verifying the withdrawal request using a second confirmed nullifier. Upon successful verification of the withdrawal request, the method involves transmitting the plurality of tokens to the owner, recording the second confirmed nullifier in the smart contract data object and burning the second plurality of confirmed UTXOs from the confirmed UTXO merkle tree data structure.

In some embodiments, the pending nullifier is generated using a hash function of a pending nonce, a Elliptic-curve Diffie-Hellman (ECDH) shared secret, and the value of the plurality of tokens.

In some embodiments, the first and second confirmed nullifiers are generated using a hash function of a confirmed nonce, a private key of the owner, and the value of the plurality of tokens.

In some embodiments, verifying the transfer request involves using zero-knowledge proof and a Circom circuit to prove that the first plurality of confirmed UTXOs exist in the confirmed UTXO merkle tree data structure, the first confirmed nullifier is mapped to the first plurality of confirmed UTXOs, the first confirmed nullifier has not been recorded in the smart contract data object, the plurality of pending UTXOs do not exist in the pending UTXO merkle tree data structure, and the first plurality of confirmed UTXOs and the plurality of pending UTXOs correspond to the same token value.

In some embodiments, verifying the extraction request involves using zero-knowledge proof and a Circom circuit to prove that the plurality of pending UTXOs exist in the pending UTXO merkle tree data structure, the pending nullifier is mapped to the plurality of pending UTXOs, the pending nullifier has not been recorded in the smart contract data object, the second plurality of confirmed UTXOs do not exist in the confirmed UTXO merkle tree data structure, and the plurality of pending UTXOs and the second plurality of confirmed UTXOs correspond to the same token value.

In some embodiments, verifying the withdrawal request involves using zero-knowledge proof and a Circom circuit to prove that the second plurality of confirmed UTXOs exist in the confirmed UTXO merkle tree data structure, the second confirmed nullifier is mapped to the second plurality of confirmed UTXOs, and the second confirmed nullifier has not been recorded in the smart contract data object.

In some embodiments, the smart contract data object of the computing method further comprises an event bus that can be queried by the receiver blockchain wallet to check for pending UTXOs in the pending UTXO merkle tree data structure that are assigned to the receiver blockchain wallet.

In some embodiments, the computing method further involves setting an expiration time limit, and upon the expiration time limit lapsing, automatically extracting the plurality of pending UTXOs from the pending UTXO merkle tree data structure and returning the plurality of tokens to the sender blockchain wallet, where the plurality of pending UTXOs have not been extracted within the expiration time limit.

In some embodiments, the receiver blockchain wallet of the computing method is a custodial wallet that can be accessed by a plurality of entities to extract and consume the plurality of pending UTXOs in the pending UTXO merkle tree data structure and the second plurality of confirmed UTXOs in the confirmed UTXO merkle tree data structure, where the plurality of entities can simultaneously access the custodial wallet through access control.

In accordance with an aspect, there is provided a non-transitory computer readable medium storing computer interpretable instructions, which when executed by a computer processor, cause the computer processor to perform a method for processing private blockchain distributed ledger based transactions using two UTXO merkle tree data structures. The method involves persisting a smart contract data object comprising a pending UTXO merkle tree data structure and a confirmed UTXO merkle tree data structure. The method involves receiving a plurality of tokens from a sender blockchain wallet to be sent to a receiver blockchain wallet; generating and inserting a first plurality of confirmed UTXOs corresponding to the plurality of tokens into the confirmed UTXO merkle tree data structure; receiving a transfer request from the sender blockchain wallet to transfer the plurality of tokens to the receiver blockchain wallet; and verifying the transfer request and the sender blockchain wallet using a first confirmed nullifier. Upon successful verification of the transfer request, the method involves generating and inserting a plurality of pending UTXOs into the pending UTXO merkle tree data structure, recording the first confirmed nullifier in the smart contract data object, and burning the first plurality of confirmed UTXOs from the confirmed UTXO merkle tree data structure, where the plurality of pending UTXOs are encrypted using public keys associated with the sender blockchain wallet and the receiver blockchain wallet. The method further involves receiving an extraction request from an owner to extract the plurality of pending UTXOs, wherein the owner is one of the sender blockchain wallet and the receiver blockchain wallet; and verifying the extraction request and the owner using a pending nullifier. Upon successful verification of the extraction request, the method involves extracting the plurality of pending UTXOs from the pending UTXO merkle tree data structure, generating a second plurality of confirmed UTXOs in the confirmed UTXO merkle tree data structure, and recording the pending nullifier in the smart contract data object. The method further involves receiving a withdrawal request from the owner to withdraw the plurality of tokens; and verifying the withdrawal request using a second confirmed nullifier. Upon successful verification of the withdrawal request, the method involves transmitting the plurality of tokens to the owner, recording the second confirmed nullifier in the smart contract data object and burning the second plurality of confirmed UTXOs from the confirmed UTXO merkle tree data structure.

Additional features and advantages will be described hereinafter. It should be appreciated by those skilled in the art that the conception and specific embodiment disclosed may be readily utilized as a basis for modifying or designing other structures. It should also be realized by those skilled in the art that such equivalent constructions do not depart from the spirit and scope of the embodiments described herein. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the embodiments described herein.

BRIEF DESCRIPTION OF THE DRAWINGS

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

Figure 1:
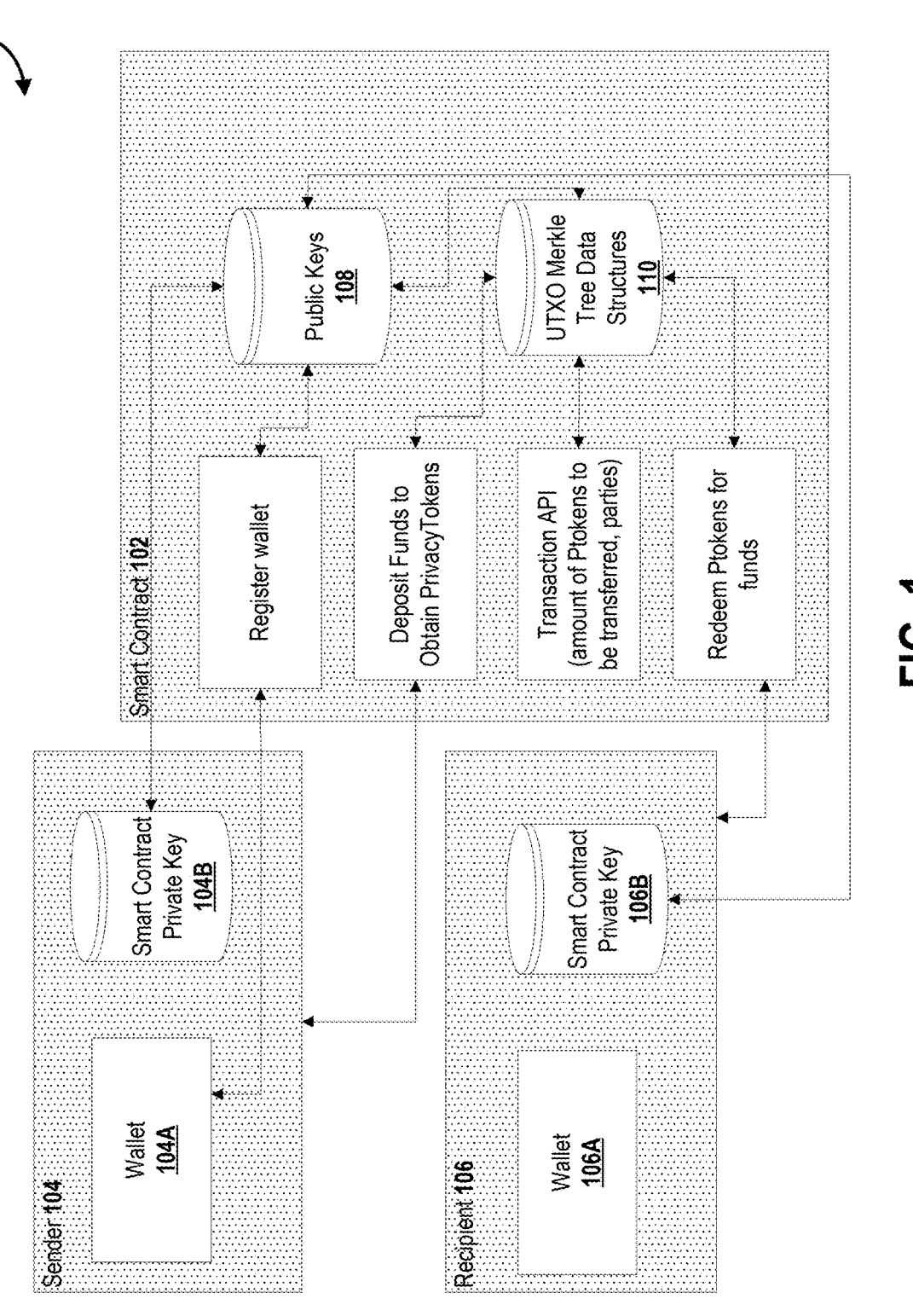
FIG. 1 is a block schematic diagram of an example system for a blockchain privacy-enabled transaction protocol using specialized UTXO merkle tree data structures for distributed ledger transactions, according to some embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

It is desired to have a blockchain transaction protocol that provides enhanced privacy for each transaction such that a third party cannot view or access details of the transaction (e.g., parties involved, amount of the transaction, etc.) A private transaction refers to a transaction where only the participants involved (i.e., the sender and receiver) are able to know the full details of the transaction, including the sender, receiver, and transaction amount.

All other third parties are unable to access this information. This technical design ensures the privacy of the transaction, preventing unauthorized parties from viewing the transaction details. Privacy concerns are becoming increasingly prominent. While the transparency characteristics of blockchains ensures data security and transaction traceability, it also raises risks of personal and business data exposure. Public transaction records can reveal user identities, asset details, and transaction behaviors, leading to privacy issues that may result in economic losses and security threats.

Consequently, privacy transactions have become a critical need in the blockchain space to protect users' sensitive information from unnecessary exposure. A level of privacy from third parties is useful for sensitive transactions as between parties. Examples of sensitive transactions can include payroll transactions, inter-family transfers (e.g., one child having an allowance greater than another child), among others. However, a regulator may desire to be able to uncloak these transactions for tax auditing purposes, among others.

It is also desired to have a blockchain transaction protocol that allows senders to cancel or reverse a transaction in. Typical cryptocurrency transactions are irreversible after being confirmed and recorded on a blockchain, which makes alteration or reversal difficult or impossible in situations where a mistake has occurred. If, for example, the recipient address was entered incorrectly then the recipient would not know that the sender had transferred tokens to them and the funds would possibly never be extracted and stuck.

To achieve both privacy and the ability to revoke a transaction, an improved computational privacy based approach is proposed to allow for a blockchain privacy enabled transaction protocol for processing distributed ledger transactions of a specially configured blockchain smart contract. The approach describes a cryptographic process, along with a corresponding apparatus and computer program products using a pair of specialized UTXO merkle tree data structures based on zero-knowledge proofs and sets of public-private key pairs. The process includes storing a transaction amount as UTXOs into a first merkle tree data structure and confirming the transaction by claiming ownership using private tokens over the UTXOs in the first merkle tree data structure and moving the UTXOs to a second merkle tree data structure for redemption.

An example approach for private transactions is Anonymous Zether, an EVM-based privacy payment system designed to protect the privacy of blockchain transactions. It uses encryption and zero-knowledge proof (ZKP) technology to conceal the sender, receiver, and transaction amount while maintaining the system's security and transparency. Zether employs Elliptic Curve Cryptography (ECC) to protect transaction data and uses zero-knowledge proofs to verify the validity of transactions without revealing specific information. A shortcoming of using Zether is that transactions use on-chain ZKP technology for verification, which results in a high amount of gas costs. Additionally, if the recipient denies receiving funds, there is no method to verify it because all information including the sender and transaction amount are not visible.

Another example approach for private transactions is Zeto, an application providing a user interface for interacting with blockchain networks, specifically private transactions on EVM using the Zeta SDK. Users can connect their wallets, view account information, and perform transactions. Zeto also incorporates third-party non-repudiation. The contract can encrypt transfer information with a shared key combined with its own private key and public key of a third-party regulatory entity and record the transaction on the blockchain. When transfer disputes occur, the third-party entity can then intervene to verify the authenticity of the transaction. However, this approach requires offline provision of related evidence and involves third-party review of the evidence to confirm the correctness of the transaction.

Zcash is an example of a privacy-focused cryptocurrency. Zcash transactions can be transparent or they can be shielded using a type of ZKP to provide anonymity in transactions. Zcash also offers the option to engage in private transactions by using a "selective disclosure" option which allows users to prove payment for auditing purposes and to comply with regulations. The drawback of using Zcash is that it does not provide non-repudiation features and does not support a smart contract infrastructure.

FIG. 1 is a block schematic diagram of an example system for a blockchain privacy-enabled transaction protocol using specialized UTXO merkle tree data structures for distributed ledger transactions, according to some embodiments.

In FIG. 1, the example system is a distributed computing system 100 that maintains, updates, and persists a distributed ledger data object across a plurality of computing nodes, each updating the distributed ledger data object in accordance with one or more logical consensus rule mechanisms that are utilized for controlling how updates are broadcast. In some embodiments, the distributed computing system 100 is a decentralized computing system that uses blockchain data objects to represent updates to the distributed computing system using cryptographically hashed data objects that are sequentially coupled together in a series of update blocks, and the distributed computing system 100 is configured for smart contract functionality where the distributed ledger can also be used to provide a runtime environment for transaction execution, operating as a deterministic state machine in accordance with a Turing-complete instruction set.

The distributed computing system 100 is a proposed smart contract data object 102 that is specially configured for the improved privacy based approach that is adapted for enhanced privacy, non-repudiation support and reversibility of distributed ledger transactions using zero-knowledge proofs and a set of auditor generated public/private key pairs. The purpose of this proposed approach is to improve existing privacy transaction protocols to enhance privacy while providing non-repudiation support and the ability to reverse transactions. Specifically, the specialized configuration provides a technical mechanism that uses UTXO merkle tree data structures to ensure data authenticity, without exposing transaction information to non-participating parties.

The proposed smart contract data object 102 operates on the distributed computing system 100, and is a smart contract data object 102 that is associated with a plurality of parties to the transaction. The parties are represented through associated public keys 108 relating to a specific wallet address 104A belonging to a sender 104 and a specific wallet address 106A belonging to a recipient 105 that can hold digital assets or digital objects on the distributed computing system 100. The smart contract data object 102 is configured such that digital assets can be stored corresponding to the smart contract data object 102 itself, and transactions can occur as between the parties in the smart contract data object 102, but third parties are not able to decipher the transactions that are occurring because the specific parties and the amounts being transferred are not exposed.

As described herein, the sender 104 registers their wallet 104A with the smart contract data object 102 to generate a private key 104B and an associated public key. The sender 104 can send funds to the recipient 106, who also has a wallet 106A registered with the smart contract data object 102 and a corresponding private key 106B. The sender 104 can deposit the funds into the smart contract data object 102, which will then generate privacy tokens to be transferred to the sender 104 and the recipient 106, such that both the sender 104 and the recipient 106 can use the tokens to later redeem the funds. When the sender 104 deposits the funds into the smart contract data object 102, the funds are converted into UTXOs and stored into UTXO merkle tree data structures 110. The smart contract 102 can have a transaction API to account for the transaction information, such as the amount of privacy tokens to be transferred and the parties. The recipient 106 can then use their private key 106B to validate the transaction and redeem their privacy tokens to withdraw the stored funds.

Accordingly, the proposed approach extends existing privacy transaction protocols by introducing a series of features to support non-repudiation and the ability to reverse transactions while maintaining transaction privacy. These features are implemented through modifications and extensions to smart contracts, specifically including a few key functions, as described for FIGS. 5-11.

In some embodiments, there can be more than two parties to a transaction, which can be a controllable factor that is adjustable through the configuration of the underlying execution logic of the proposed smart contract data object 102.

Figure 2:
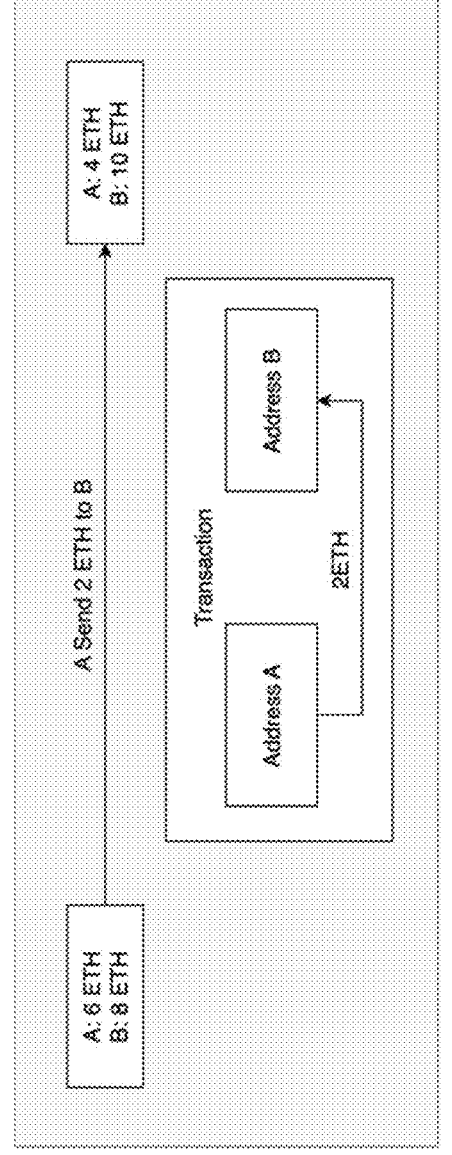
FIG. 2 shows a comparison between an example account-based blockchain model and an example unspent transaction output (UTXO) blockchain model, according to some embodiments.
Figure 2:
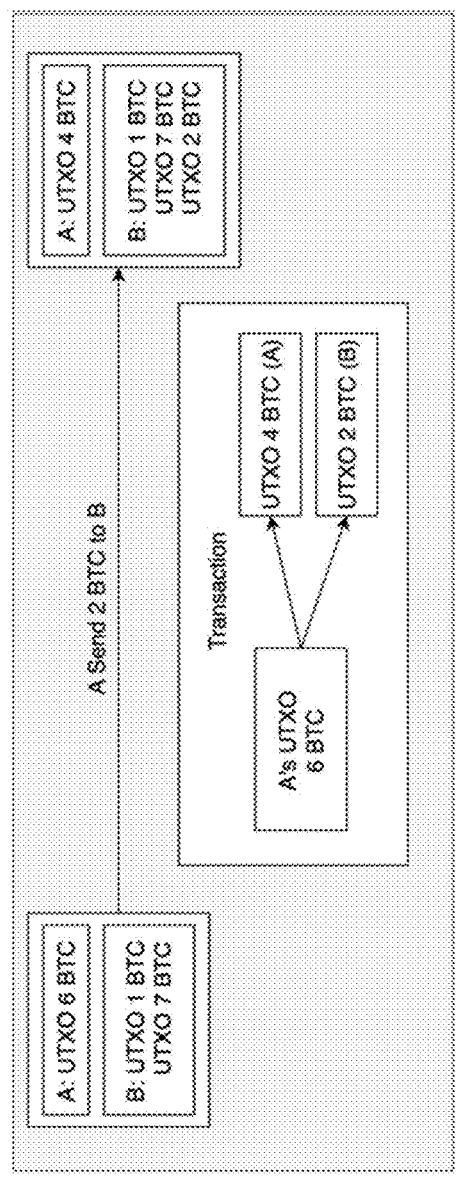

FIG. 2 shows a comparison between an example account-based blockchain model and an example unspent transaction output (UTXO) blockchain model, according to some embodiments.

In account-based models, a single balance is maintained for each account and transactions directly update balances by subtracting from the sender's account and adding to the recipient's account. In this way, the balances of accounts are tracked based on the overall account state, without tracking what constitutes the actual balance itself. For example, in FIG. 2, Alice (A) starts out with a balance of 6 ETH and Bob (B) starts out with 8 ETH. If A sends 2 ETH to B, then A's balance becomes 4 ETH and B's balance becomes 10 ETH. The transaction essentially consists of 2 ETH being transferred from A's address to B's address.

In UTXO models, transactions involve the sender "consuming" UTXOs that allows the sender to send bitcoins in the transaction and creating new UTXOs for the recipient representing the change amounts. For example, in FIG. 2, A starts out with a balance of 6 UTXOs and B starts out with a group of 1 UTXO and a group of 7 UTXOs, each group representing a different transaction. When A consumes 2

UTXOs to send 2 tokens to B, A's balance becomes 4 UTXOs and B gains the 2 tokens and as a result, 2 new UTXOs are created and listed as a third group in B's balance. After the transaction, A's original 6 UTXOs becomes 4 UTXOs in A's balance and 2 UTXOs in B's balance. In other words, UTXOs can be thought of as currency that allows an entity to spend/send tokens. Each UTXO is non-fungible and can only be spent once.

Using the UTXO model prevents issues such as double spending and ensures that inputs of a transaction will equal the outputs while maintaining balance in the network. The UTXO model also operates without central control, which allows for decentralized transaction management. Account models also have scalability challenges with many accounts, which UTXO models can overcome with parallel transaction processing capabilities.

Figure 3:
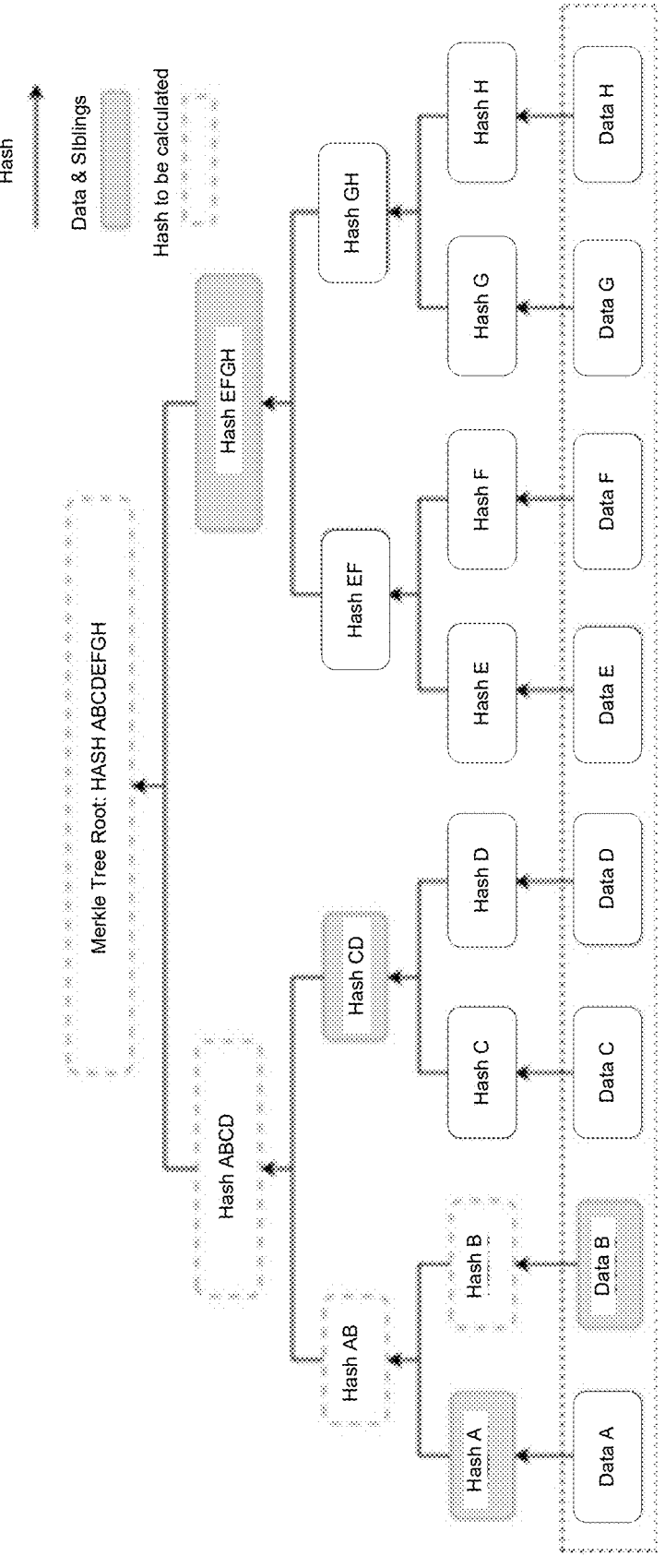
FIG. 3 shows the components of an example UTXO merkle tree data structure, according to some embodiments.

FIG. 3 shows the components of an example UTXO merkle tree data structure, according to some embodiments.

Merkle trees are tree data structures in which every leaf node is labelled with the cryptographic hash of a data block, and every node that is not a leaf (i.e., a branch) is labelled with the cryptographic hash of the labels of its child nodes. The hash values are combined and hashed again at each level of the tree going up from the leaves, and the final hash value on the topmost level (i.e., at the merkle root) is stored as a summary of all the transactions within the blocks. As shown in FIG. 3, the data blocks (i.e., Data A, Data B, Data C, etc.) each contain a UTXO transaction. A cryptographic hash of each data block or UTXO transaction is then calculated and used to label the bottom-most leaf nodes in the merkle tree (i.e., Hash A, Hash B, etc.). The hashes are then combined in pairs, and each pair is hashed again to generate new hash values for the layer above the leaf nodes (i.e., Hash AB, Hash CD, etc.). The hashing continues going up the tree until the top hash.

The merkle root can be stored in the block header, which can then added to the blockchain. When a new block is added to the blockchain, the merkle root of the previous block is included in the header of the new block. This creates a chain of blocks in the blockchain, with each block containing the merkle root of the previous block.

Merkle tree proof generation can be provided from the merkle trees via public functions of the proposed smart contract such that clients do not need to maintain a whole mirror image of the UTXO merkle trees to be the same as the merkle trees on the smart contract. As shown in FIG. 3, to prove that the hash of Data B exists in the merkle tree, providing a merkle tree proof consisting of the colored nodes is sufficient. A verifier can then calculate the hashes of the colored nodes layer by layer to ultimately obtain the merkle tree root. The merkle tree root can then be compared with the merkle tree root obtained from another trusted registry to verify whether the merkle tree has been tampered with.

Some solutions require clients to maintain the entire merkle tree locally by listening to smart contract events and generating the merkle tree proof from the local merkle tree data when needed. The drawback of these solutions is that if a client misses any event, the merkle tree that is maintained by the client will become inconsistent with the one maintained by the smart contract, resulting in a merkle tree proof that cannot be verified by the smart contract.

In contrast, the embodiments proposed herein provides a smart contract data structure that maintains the entire merkle tree. When a client needs to generate the merkle tree proof to prove that a specific leaf node exists in the tree, the client can obtain the merkle tree proof by calling a function provided by the smart contract data object.

Merkle trees provide enhanced security for cryptocurrency transactions. Because of the structure of merkle trees, any modification to data within the tree is easily detected because any change in the data blocks would result in a different hash value being generated, which would be perpetuated up the merkle tree to the merkle root. Such a modification would be detected easily during the verification process. The ability to detect changes in the merkle root based on any differences in the data nodes allows for quick identification of inconsistencies. The added layer of security that merkle trees provide to a blockchain makes it difficult for attackers to tamper with the data blocks.

Figure 4:
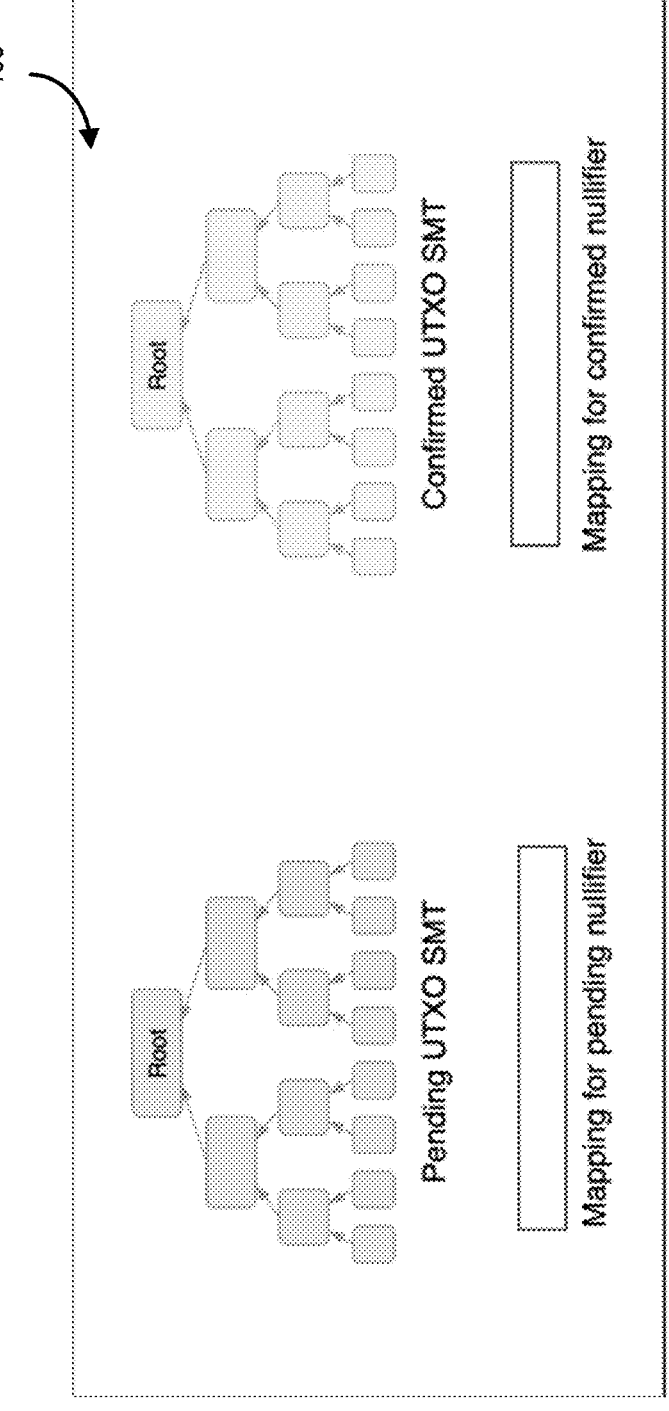
FIG. 4 shows a pair of specialized UTXO merkle tree data structures of an example smart contract for the proposed blockchain privacy-enabled transaction protocol, according to some embodiments.

FIG. 4 shows a pair of specialized UTXO merkle tree data structures of an example smart contract for the proposed blockchain privacy-enabled transaction protocol, according to some embodiments.

System 400 shows a pending UTXO sparse merkle tree (SMT) data structure 110 and a confirmed UTXO SMT, each with a mapping for corresponding nullifiers. Embodiments described herein use the pair of pending and confirmed UTXO SMTs to manage the UTXO transactions within the smart contract 102 from FIG. 1. When the sender consumes a certain number of input UTXOs, some output UTXOs are generated and stored in the pending UTXO SMT until a recipient extracts them into the confirmed UTXO SMT. Once this occurs, the transaction is considered to be successfully completed.

The use of the pending merkle tree is crucial in the proposed approach. The pending UTXO SMT sets the conditions and time limits for unlocking funds, ensuring that only the intended recipient who provides the correct unlocking information and credentials (e.g., recipient's own private key) can access the transferred funds. UTXOs in the pending UTXO SMT cannot be consumed directly and must be extracted into the confirmed UTXO SMT. Only UTXOs in the confirmed UTXO SMT can be used and consumed. After a pending UTXO is extracted into the confirmed UTXO SMT, it is marked as used by recording its corresponding nullifier. A new UTXO is then generated and inserted into the confirmed UTXO SMT.

Figure 5:
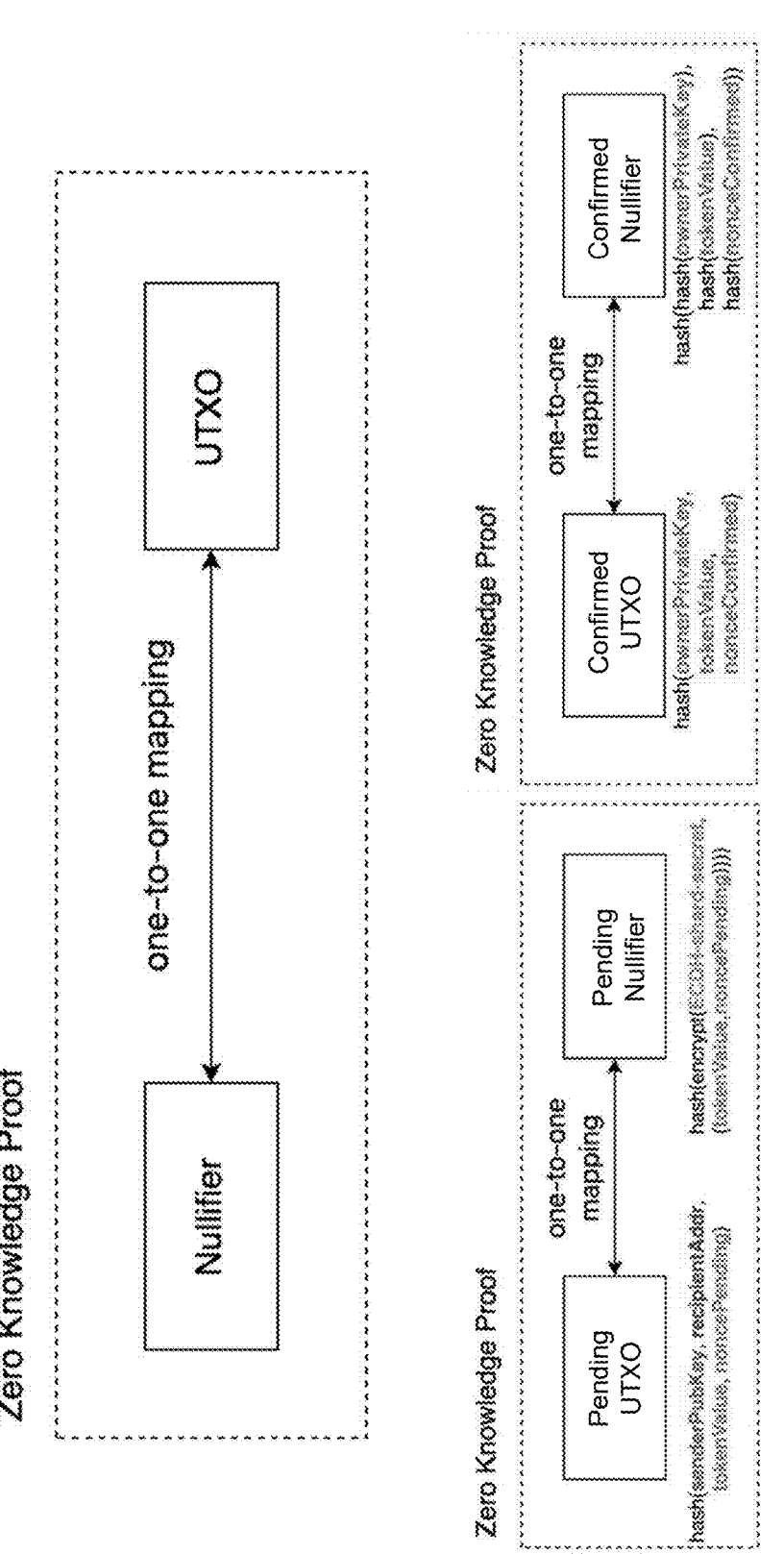
FIG. 5 shows example zero-knowledge proofs between UTXOs and nullifiers for validation, according to some embodiments.

The mappings for nullifiers included in system 400 represent mappings to the designated nullifier that can extract the UTXOs from the SMTs. Specifically, only the pending nullifier that is one-to-one mapped to the pending UTXOs can be used to extract the pending UTXOs from the pending UTXO SMT. Similarly, only the confirmed nullifier that is one-to-one mapped to the confirmed UTXOs can be used to extract the confirmed UTXOs from the confirmed UTXO SMT. FIG. 5 below illustrates this in more detail.

FIG. 5 shows example zero-knowledge proofs (ZKPs) between UTXOs and nullifiers for validation, according to some embodiments.

In the proposed approach, the user/client needs to provide nullifiers to prove ownership of the specific UTXO in question. The nullifiers and UTXOs are all hash values, the relationship between them proved by ZKP circuits.

There are two versions of the ZKP circuit corresponding to the sender and the recipient (although the pending nullifier values generated by the sender and recipient are the same). The first version is used by the sender, and the second version is used by the recipient. In the first version for the sender, it should be proven that the sender's private key can be used to derive senderPubKey. In the second version for the recipient, it should be proven that the recipient's private key can be used to derive recipientPubKey. Therefore, when calling functions of smart contract 102 to verify the ZKP, the circuit version that is being used must be declared. In other words, the smart contract 102 can record whether a specific pending UTXO was extracted by the sender or the recipient. Furthermore, combined with the OHPETPendingUTXOEvent that includes the recipientPubKey, the sender has enough information to prove that the specified recipient performed the extraction operation using their own public key.

Nullifiers are hashed values with a one-to-one mapping with designated UTXOs such that an owner/user can provide a nullifier to be verified with a UTXO through a zero knowledge proof. Only the recipient or sender can generate a nullifier that can decrypt and extract the corresponding UTXO.

In some embodiments, the smart contract can be designed such that the transfer funds can be redeemed by multiple parties. There can be multiple parties extracting and consuming the UTXOs of the same recipient account. An example implementation is by having the multiple participants create a custodial wallet. Through access control, the multiple parties can access the custodial wallet simultaneously, and the operator's information can be recorded.

As shown in FIG. 5, the pending UTXO is generated by the following:

$$\text{Pending } UTXO = \tag{1}$$
$$hash(senderPubKey, recipientAddr, tokenValue, noncePending)$$

The pending nullifier is generated by the following hash function:

$$\text{Pending Nullifier} = \tag{2}$$
$$hash\big(encrypt\big(ECDH-shared-secret, (tokenValue, noncePending)\big)\big)$$

Once the pending UTXO is inserted into the pending UTXO SMT, smart contract 102 will publicly transmit a smart contract event OHPETPendingUTXOEvent, which includes the following information: the recipient's public key, the sender's public key, the tokenValue and the noncePending. This information is encrypted twice, once with the sender's public key and once with the recipient's public key. Hence, both the recipient and sender are capable of decrypting the information with their own private keys. This ensures that the recipient or the sender, but no one else, can generate a nullifier to extract the pending UTXO from the pending UTXO SMT and generate a new confirmed UTXO in the confirmed UTXO SMT with the same tokenValue.

The noncePending value in functions (1) and (2) is set to enable the generation of distinct UTXOs even in situations where the amount and participants are the same. The noncePending value is generated by the sender before initiating the transfer, and is sent in the OHPETPendingUTXOEvent after being encrypted using the public keys of both participants through two separate encryption processes.

In some embodiments, the keys are generated using an elliptic-curve cryptography (ECC) approach. Using an existing ECC key-pair (i.e., privatekey and publickey) and a generated temporary ECC key-pair (i.e., temp-privatekey and temp-publickey), specifically the publickey and the temp-privatekey, the Elliptic-curve Diffie-Hellman (ECDH) shared secret in function (2) can be calculated. This shared secret can then be used for AES encryption of the message, resulting in a cipher text. The final encrypted content is a combination of temp-publickey and the cipher text. To decrypt, temp-publickey must be extracted from the final encrypted content. Using the temp-publickey along with the original privatekey, the shared secret can be recalculated using ECDH. This shared secret can then be used to decrypt the cipher text back into the original message.

The sender or the recipient can decrypt the OHPETPendingUTXOEvent message using their own private key and obtain both participants' public keys, tokenValue, and noncePending. If the decryption is successful, the user can construct a nullifier based on the rules for pending nullifier construction and then query the smart contract 102 to verify if the nullifier has already been used. If the nullifier has not been used, the user can extract the UTXO into the confirmed UTXO SMT.

In some embodiments, if a user is unable to fully recover their UTXOs from the pending UTXO SMTs for various reasons, the sender of these missed UTXOs can choose to extract them to the confirmed UTXO SMT at any time.

As shown in FIG. 5, the confirmed UTXO is generated by the following hash function:

$$\text{Confirmed } UTXO = \tag{3}$$
$$hash(ownerPrivateKey, tokenValue, nonceConfirmed)$$

The confirmed nullifier is generated by the following hash function:

$$\text{Confirmed Nullifier} = \tag{4}$$
$$hash(hash(ownerPrivateKey), hash(tokenValue), hash(nonceConfirmed))$$

The nonceConfirmed value in functions (3) and (4) is generated by the UTXO owner before extraction from the pending UTXO SMT and sent in a OHPETConfirmedUTXOEvent.

When the new confirmed UTXO is inserted into the confirmed UTXO SMT, the smart contract 102 will publicly transmit a smart contract event OHPETConfirmedUTXOEvent, which contains the tokenValue and nonceConfirmed. This information is encrypted using the owner's public key. Any user can attempt to decrypt the encrypted tokenValue and nonceConfirmed from the OHPETConfirmedUTXOEvent. If the decryption is successful, then the user must be the owner of the UTXO in question and it can use the decrypted tokenValue and nonceConfirmed along with its private key to generate a confirmed nullifier to consume the UTXO later. After using a nullifier, the smart contract 102 records it to prevent double spending of the UTXOs.

The user can attempt to decrypt the OHPETConfirmedUTXOEvent message using their own private key to obtain the tokenValue and nonceConfirmed values. If the decryption is successful (i.e., the user is the recipient or the sender), the user can construct a nullifier based on the rules for confirmed nullifier construction and then query the smart contract 102 to verify if the nullifier has been used already. If the nullifier has not been used, the user can use the UTXO in question for subsequent transactions.

In some embodiments, nullifiers are not necessary to complete a transaction. For transactions that do not require a high level of privacy, nullifiers do not need to be used. Using this kind of system, some information will be exposed during the transaction (e.g., Alice is the one that put the UTXO into the tree, and later when Alice sends the UTXO to Bob, if a nullifier is not used, then everyone will know Bob extracted the UTXO). When the sender provides a nullifier, the public can only see that the smart contract recorded a new nullifier and a new UTXO was inserted into the confirmed UTXO SMT-no information about the receiver or the relationship between the receiver and the sender is known or visible to the public.

Figure 6:
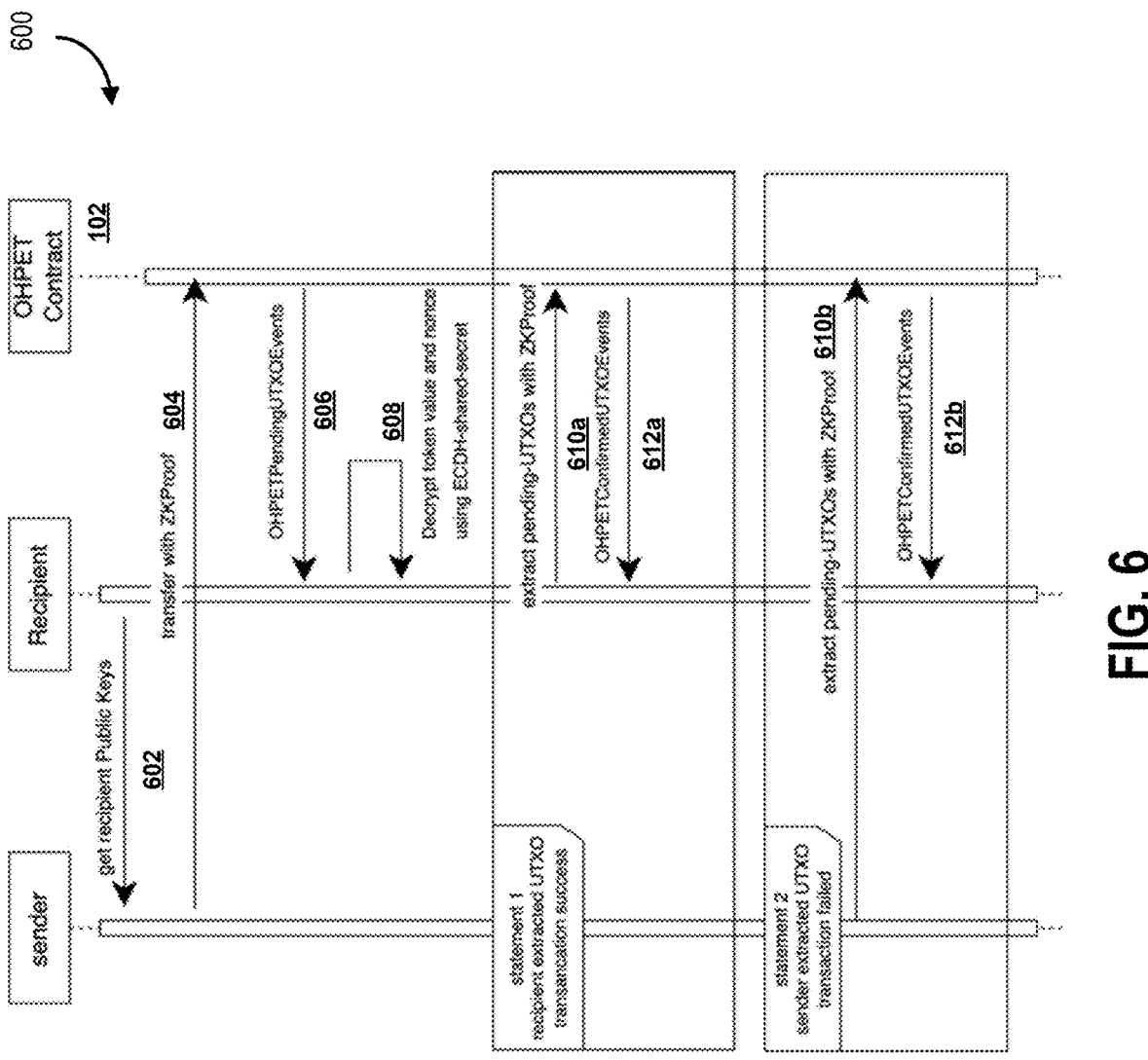
FIG. 6 is a flowchart diagram of an example transaction process using the proposed smart contract, according to some embodiments.

FIG. 6 is a flowchart diagram of an example transaction process using the proposed smart contract, according to some embodiments.

Process 600 is an example transaction process showing both possible results of a transaction success and a transaction failure.

At step 602, the sender obtains the recipient public keys from the recipient.

At step 604, the sender initiates the transfer of funds by spending a certain number of input UTXOs to generate some output UTXOs, which are then inserted into the pending UXTO SMT as pending UTXOs. The pending UTXOs are encrypted such that only the sender or the receiver can generate a nullifier mapped to the pending UTXOs that satisfies the ZKP.

At step 606, once the pending UTXO is inserted into the pending UTXO SMT, the smart contract 102 will publicly transmit a smart contract event OHPETPendingUTXOEvent, which includes the following information: the recipient's public key, the sender's public key, the tokenValue and the noncePending. This information is encrypted twice, once with the sender's public key and once with the recipient's public key. Hence, both the recipient and sender are capable of decrypting the information with their own private keys. This ensures that the recipient or the sender, but no one else, can generate a nullifier to extract the pending UTXO from the pending UTXO SMT and generate a new confirmed UTXO in the confirmed UTXO SMT with the same token-Value.

At step 608, the recipient can decrypt the OHPETPendingUTXOEvent message using their own private key and obtain both participants' public keys, tokenValue, and noncePending. If the decryption is successful, the user can construct a nullifier based on the rules for pending nullifier construction and then query the smart contract 102 to verify if the nullifier has already been used. If the nullifier has not been used, the user can extract the UTXO into the confirmed UTXO SMT.

If the recipient extracts the pending UTXO from the pending UTXO SMT, then the transaction is considered to be a success. At step 610a, the recipient extracts the pending UTXO from the pending UTXO SMT using its pending nullifier and ZKP and generates a new confirmed UTXO in the confirmed UTXO SMT with the same tokenValue. At step 612a, the smart contract 102 will publicly transmit a smart contract event OHPETConfirmedUTXOEvent, which contains the tokenValue and nonceConfirmed. This information is encrypted using the owner's public key. Any user can attempt to decrypt the encrypted tokenValue and nonce Confirmed from the OHPETConfirmedUTXOEvent. If the decryption is successful, then the user must be the owner of the UTXO in question and it can use the decrypted token-Value and nonceConfirmed along with its private key to generate a confirmed nullifier to consume the UTXO later. After using a nullifier, the smart contract 102 records it to prevent double spending of the UTXOs. If there is any pending UTXO that is intended for the sender (as change), it does not affect the completion of the transfer transaction, regardless of whether the change is extracted by the sender or not.

If the recipient, for some reason, is unable to extract the pending UTXOs from the pending UTXO SMT, the sender has the option to extract them as their own assets into the confirmed UTXO SMT. If the sender extracts the pending UTXO from the pending UTXO SMT, then the transaction is considered to be a failure, but the UTXOs will not be lost as they can still be extracted. At step 610b, the sender extracts the pending UTXO from the pending UTXO SMT using its pending nullifier and ZKP and generates a new confirmed UTXO in the confirmed UTXO SMT with the same tokenValue. At step 612b, the smart contract 102 will publicly transmit a smart contract event OHPETConfirmedUTXOEvent, which contains the tokenValue and nonceConfirmed. This information is encrypted using the owner's public key. Any user can attempt to decrypt the encrypted tokenValue and nonce Confirmed from the OHPETConfirmedUTXOEvent. If the decryption is successful, then the user must be the owner of the UTXO in question and it can use the decrypted tokenValue and nonceConfirmed along with its private key to generate a confirmed nullifier to consume the UTXO later. After using a nullifier, the smart contract 102 records it to prevent double spending of the UTXOs.

All the OHPETPendingUTXOEvents and OHPETConfirmedUTXOEvents are stored on an event bus located on the smart contract, not a temporary network communication method, so the events will not be lost if the receiver did not receive the transmission at the time. When the pending UTXOs are reclaimed/extracted, the event bus is updated with another event to indicate pending UTXOs have been reclaimed or extracted already so the receiver would need to read and check all the events to calculate the balance in the SMTs.

In some embodiments, the receiver can query the event bus on the smart contract to check if there are any UTXOs assigned to them in the pending UTXO SMT, which indicates that someone sent the receiver money or funds that they need to extract and withdraw from the smart contract.

In some embodiments, after a transaction is initiated, the sender could set a timer (e.g., 24 hours) to automatically revert the transaction. If the recipient failed to extract the pending UTXOs, the sender can revert the transaction when the timer is up. If the recipient has successfully extracted the pending UTXOs into the confirmed UTXO SMT, the revert function call will fail because the nullifier generated by the sender and recipient will be the same. This timer mechanism would have no impact on the complete functionality of the process proposed herein.

In some embodiments, there can be multiple parties capable of consuming the UTXOs of the same sender/receiver account. An example implementation of this is having the participants of the transaction create a custodial wallet. Through access control, multiple parties can access this custodial wallet simultaneously, and the operator's information can be recorded. This portion may incorporate a Web2 solution rather than a pure Web3 solution.

Figure 7:
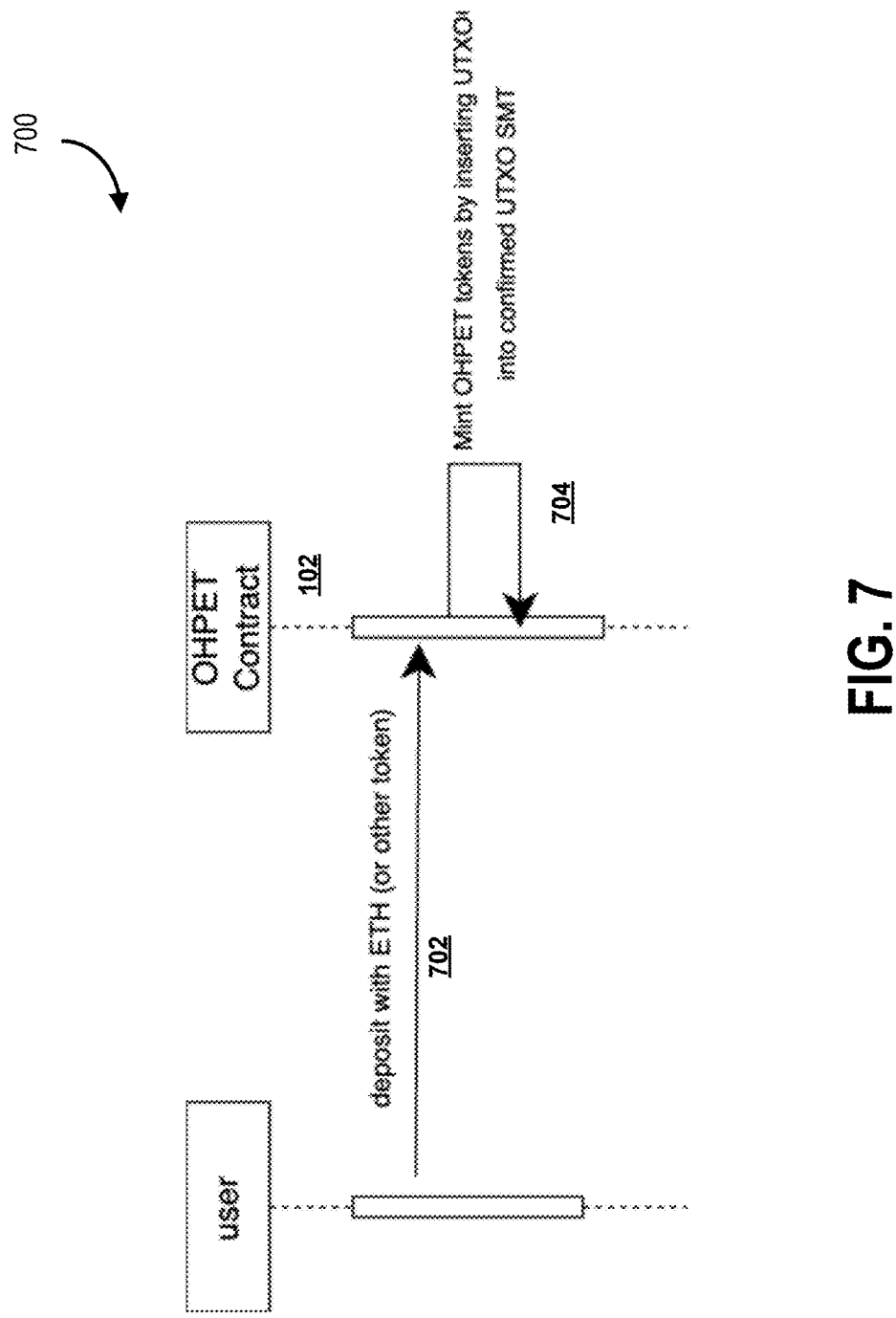
FIG. 7 is a flowchart diagram of the deposit/minting process of an example private transaction using the proposed smart contract, according to some embodiments.

FIG. 7 is a flowchart diagram of the deposit/minting process 700 of an example private transaction using the proposed smart contract, according to some embodiments.

At step 702, the sender/user deposits a number of ETH or other tokens into the smart contract 102.

At step 704, the smart contract 102 mints the tokens by inserting UTXOs into the confirmed UTXO SMT.

Figure 8:
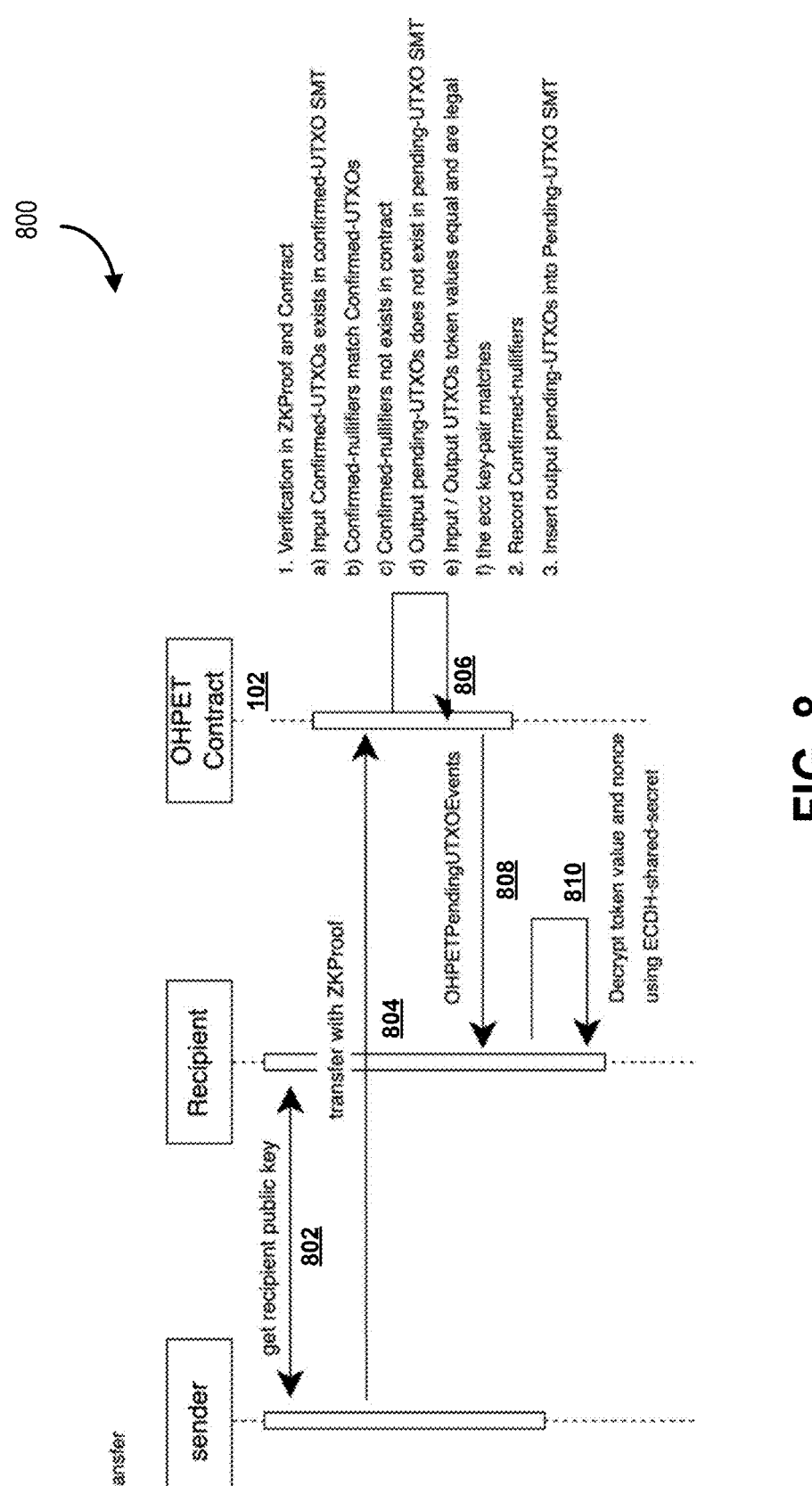
FIG. 8 is a flowchart diagram of the transfer process of an example private transaction using the proposed smart contract, according to some embodiments.

FIG. 8 is a flowchart diagram of the transfer process 800 of an example private transaction using the proposed smart contract, according to some embodiments.

At step 802, the sender and the recipient obtain public keys from each other.

At step 804, the sender initiates the transfer of funds by spending a certain number of input UTXOs to generate some output UTXOs. The pending UTXOs are encrypted such that only the sender or the receiver can generate a nullifier mapped to the pending UTXOs that satisfies the ZKP.

At step 806, the smart contract 102 verifies the transfer using ZKP and a Circom circuit. The ZKP and Circom circuit must prove that the input confirmed UTXOs exist in the confirmed UTXO SMT, the confirmed nullifiers match the confirmed UTXOs, the confirmed nullifiers have not yet been recorded and do not exist in the smart contract 102, the output pending UTXOs do not exist in the pending UTXO SMT, the input and output UTXOs' corresponding token values are equal and legal, and the ECC key-pair matches. Once the ZKP is satisfied, the smart contract 102 then records the confirmed nullifiers and inserts the output pending UTXOs into the pending UTXO SMT.

At step 808, once the pending UTXO is inserted into the pending UTXO SMT, the smart contract 102 will publicly transmit a smart contract event OHPETPendingUTXOEvent, which includes the following information: the recipient's public key, the sender's public key, the tokenValue and the noncePending. This information is encrypted twice, once with the sender's public key and once with the recipient's public key. Hence, both the recipient and sender are capable of decrypting the information with their own private keys. This ensures that the recipient or the sender, but no one else, can generate a nullifier to extract the pending UTXO from the pending UTXO SMT and generate a new confirmed UTXO in the confirmed UTXO SMT with the same tokenValue.

At step 810, the recipient can decrypt the OHPETPendingUTXOEvent message using their own private key and obtain both participants' public keys, tokenValue, and noncePending. If the decryption is successful, the user can construct a nullifier based on the rules for pending nullifier construction and then query the smart contract 102 to verify if the nullifier has already been used. If the nullifier has not been used, the user can extract the UTXO into the confirmed UTXO SMT.

Each transfer transaction has a maximum of two output UTXOs, only one of which can be designated for the recipient, while the other UTXO, if present, must be designated for the sender as change. This design ensures data synchronization and avoids scenarios where multiple recipients receive funds, with some extracting pending UTXOs while others do not. Because there is at most one UTXO that can be sent to the recipient in a single transaction, the transfer transaction is considered to be completed when two situations occur. The first scenario is when the recipient extracts the output pending UTXO to the confirmed UTXO SMT and the transaction is considered to be successful. The second scenario is when the recipient fails to successfully withdraw and the sender extracts the output pending UTXO to the confirmed UTXO SMT and the transaction is considered to be failed/reverted. If there is any output pending UTXO that is intended for the sender as change, it does not affect the completion of the transfer transaction, regardless of whether it is extracted by the sender or not.

Embodiments described herein guarantee non-repudiation of the sender. When initiating a transfer, the sender can set an expiration time and lock the funds in the smart contract 102. The sender can define a condition in the pending UTXO SMT: only if the recipient provides the correct hash value within the specified time can the funds be transferred to the recipient's electronic wallet. If the recipient fails to provide the correct information within the specified time, the funds will be returned to the sender. Through this mechanism, the sender cannot claim that they did not initiate the transfer.

Embodiments described herein ensure non-repudiation of the recipient. By scanning the publicly available event information on the blockchain, the receiver obtains a notification indicating that there is a pending transfer in the pending UXTO SMT. The receiver can use their own private key to decrypt and extract the pending UTXOs from the pending UTXO SMT into the confirmed UTXO SMT. If the recipient claims that they did not receive the funds, the hash in the confirmed UTXO SMT will prove their claim is false. In other words, once the recipient unlocks and receives the funds, this action is recorded and cannot be repudiated. If the recipient fails to fully recover their UTXOs from the pending UTXO SMT for various reasons, the senders of these missed UTXOs can choose to extract them to the confirmed UTXO SMT at any time.

In some embodiments, the decentralized application the smart contract 102 is running on can automatically send a notification to the recipient to inform them of the pending transfer. After receiving the notification, the recipient must perform a confirmation signature operation, which records the recipient's action and ensures that they cannot later deny that they received and confirmed the transfer. If the recipient fails to confirm within the specified time, the transfer will fail and the funds will be returned to the sender. All steps of this process are recorded for auditing and tracking purposes.

In case of disputes (e.g., the sender claims to have made the transfer, but the recipient denies receiving it), verification and arbitration can be conducted based on the recorded transfer status on the blockchain, execution status in the UXTO SMTs, and the digital signatures of both parties. These immutable records provide strong evidence for third parties or arbitration bodies to ensure a fair resolution of any disputes.

Figure 9:
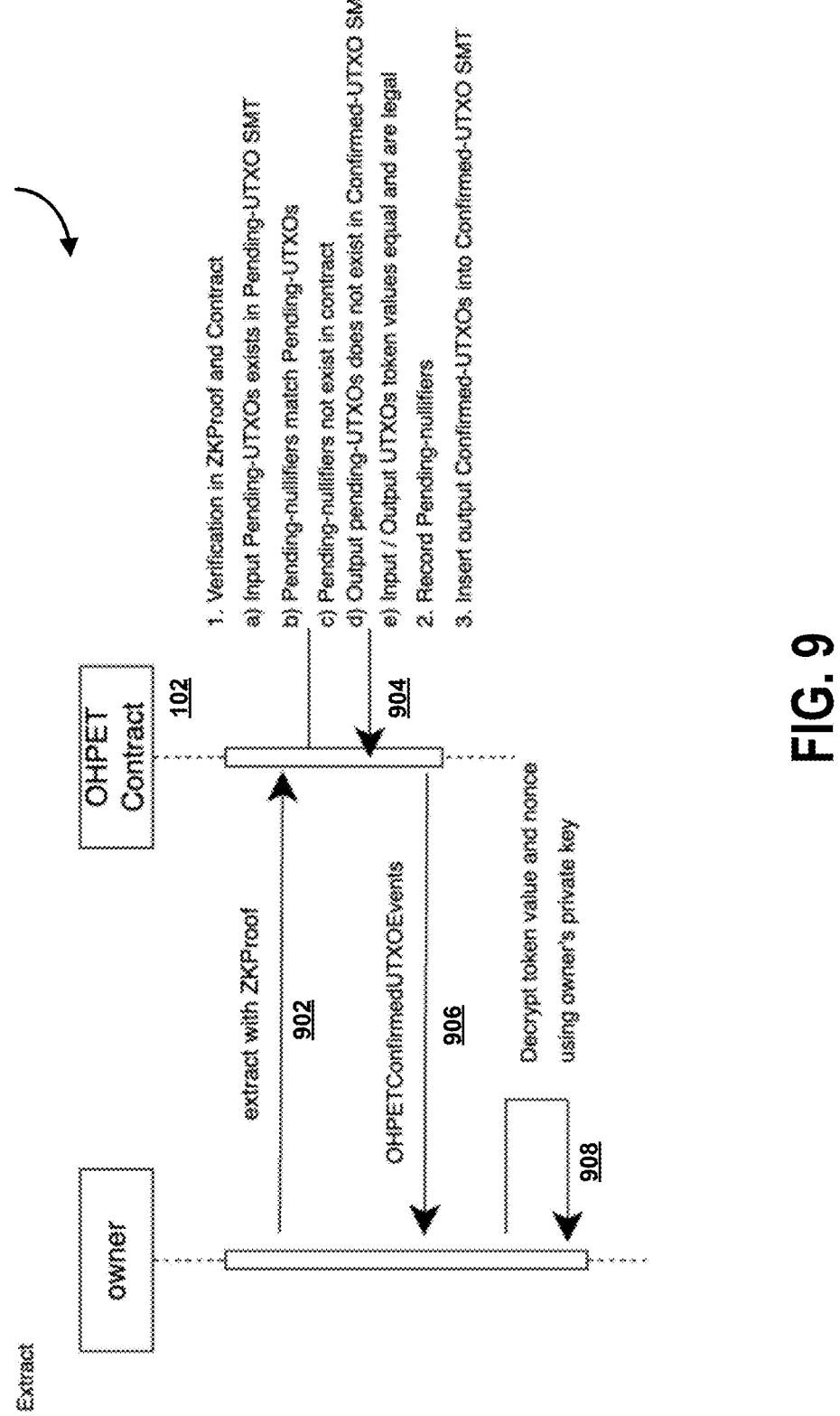
FIG. 9 is a flowchart diagram of the extraction process of an example private transaction using the proposed smart contract, according to some embodiments.

FIG. 9 is a flowchart diagram of the extraction process 900 of an example private transaction using the proposed smart contract, according to some embodiments.

At step 902, an owner initiates the extraction of the pending UXTO from the pending UTXO SMT to the confirmed UTXO SMT. The owner can be either the sender or the receiver since they can both generate the same pending nullifier.

At step 904, the smart contract 102 verifies the extraction using ZKP and a Circom circuit. The ZKP and Circom circuit must prove that the input pending UTXOs exist in the pending UTXO SMT, the pending nullifiers match the pending UTXOs, the pending nullifiers have not yet been recorded and do not exist in the smart contract 102, the output confirmed UTXOs do not exist in the confirmed UTXO SMT, and the input and output UTXOs' corresponding token values are equal and legal. Once the ZKP is satisfied, the smart contract 102 then records the pending nullifiers and inserts the output confirmed UTXOs into the confirmed UTXO SMT.

At step 906, once the confirmed UTXO is inserted into the confirmed UTXO SMT, the smart contract 102 will publicly transmit a smart contract event OHPETConfirmedUTXOEvent, which contains the tokenValue and nonceConfirmed. This information is encrypted using the owner's public key. Any user can attempt to decrypt the encrypted tokenValue and nonce Confirmed from the OHPETConfirmedUTXO- Event. If the decryption is successful, then the user must be the owner of the UTXO in question and it can use the decrypted tokenValue and nonceConfirmed along with its private key to generate a confirmed nullifier to consume the UTXO later.

At step 908, the owner can decrypt the OHPETConfirmedUTXOEvent message using their own private key and obtain the tokenValue, and nonceConfirmed.

Figure 10:
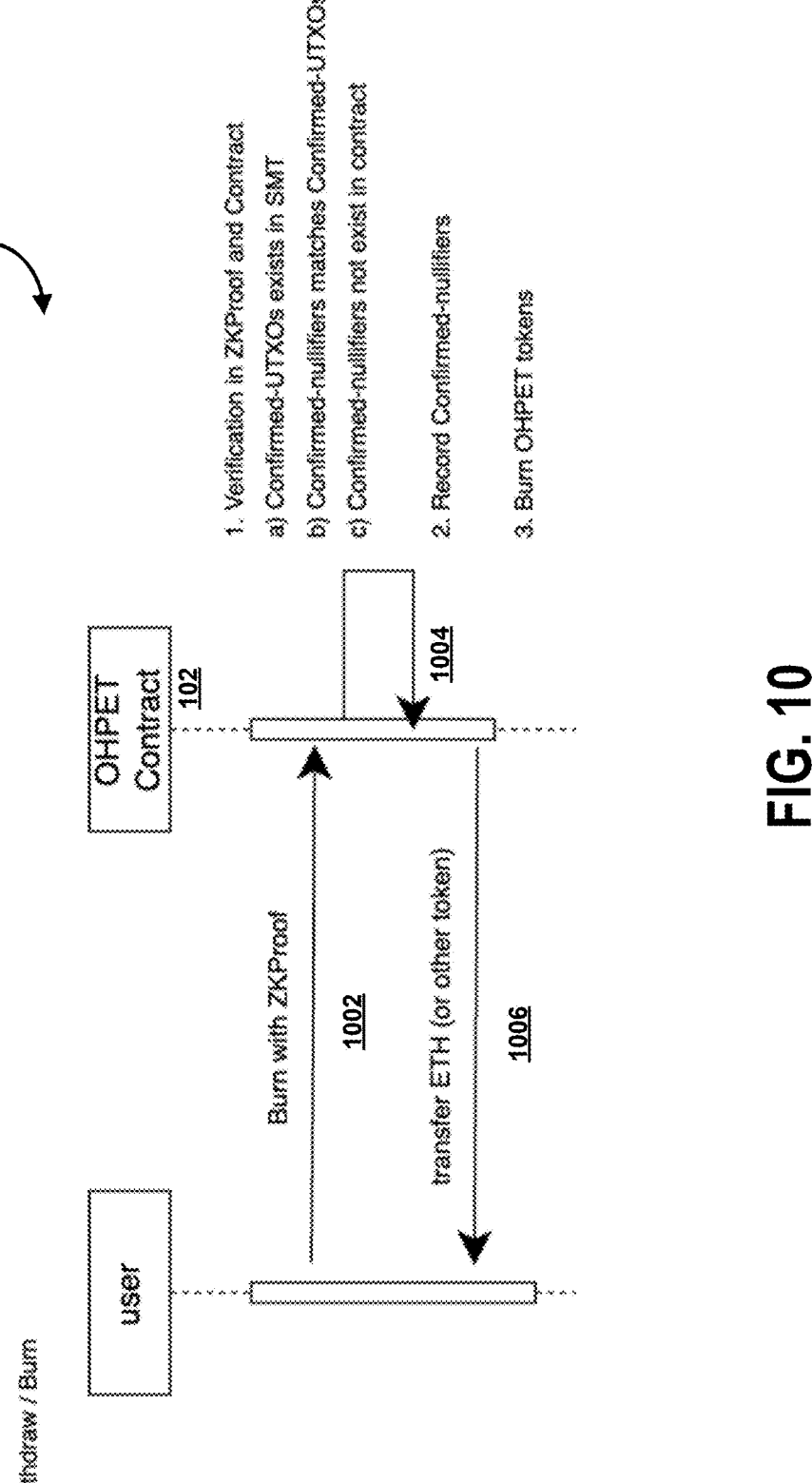
FIG. 10 is a flowchart diagram of the withdrawal/burning process of an example private transaction using the proposed smart contract, according to some embodiments.

FIG. 10 is a flowchart diagram of the withdrawal/burning process of an example private transaction using the proposed smart contract, according to some embodiments.

At step 1002, a user initiates the withdrawal of the funds and burning of the confirmed UTXOs.

At step 1004, the smart contract 102 verifies the withdrawal using ZKP. The ZKP must prove that the confirmed UTXOs exist in the confirmed UTXO SMT, the confirmed nullifiers provided by the user match the confirmed UTXOs, the confirmed nullifiers have not been recorded and do not yet exist in the smart contract 102. Once the ZKP is satisfied, the smart contract 102 then records the confirmed nullifiers and burns the confirmed UTXO tokens.

At step 1006, the smart contract 102 transfers the ETH or other token funds to the user's designated digital wallet.

Figure 11:
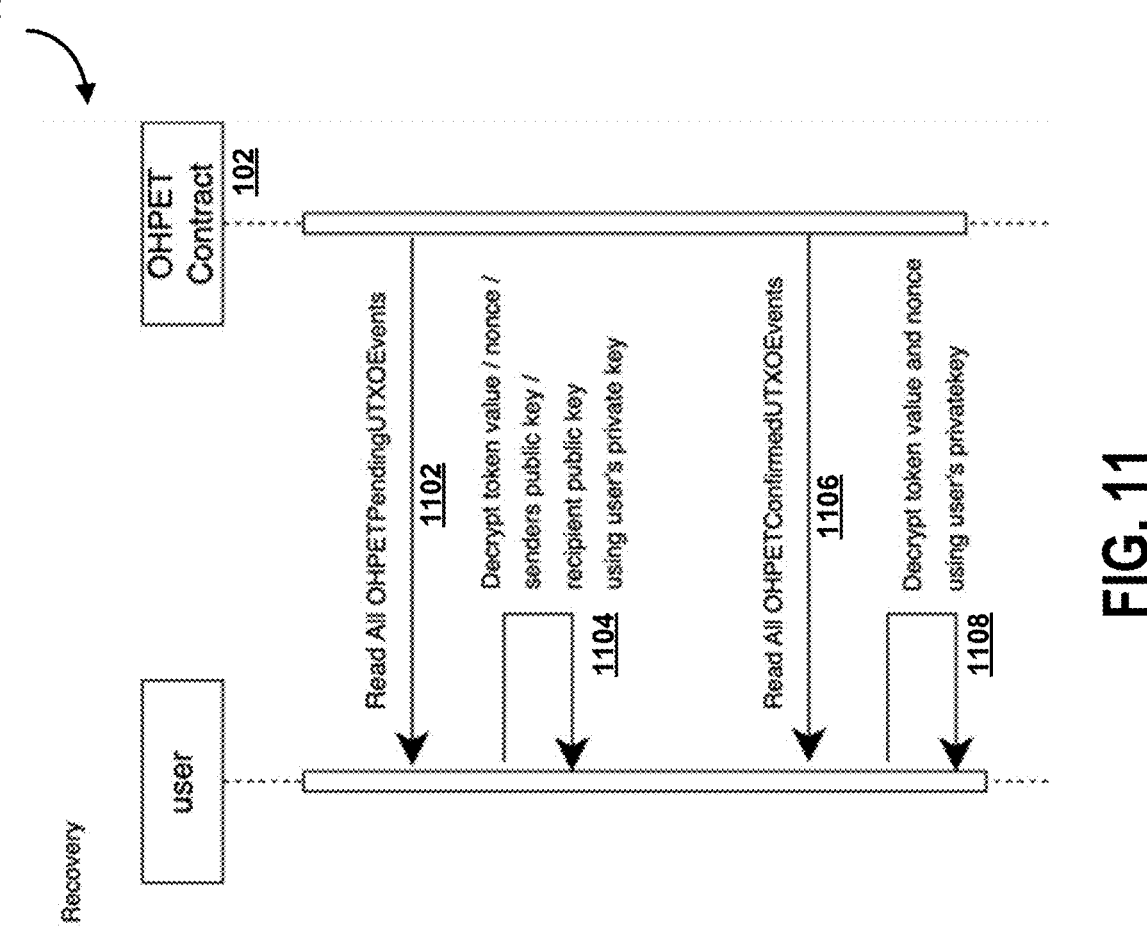
FIG. 11 is a flowchart diagram of the user wallet recovery process of an example private transaction using the proposed smart contract, according to some embodiments.

FIG. 11 is a flowchart diagram of the user wallet recovery process 1100 of an example private transaction using the proposed smart contract, according to some embodiments. Process 1100 may be necessary when a user needs to recover/restore their digital wallet (e.g., after re-installing the client).

At step 1102, the user reads all the OHPETPendingUTXOEvents from the smart contract data object 102.

At step 1104, since the contents of the OHPETPendingUTXOEvents are encrypted using the public keys of both the sender and the recipient, the user can attempt to decrypt the contents of the OHPETPendingUTXOEvents using the user's own private key. If the decryption is successful, then the user must be either the sender or the recipient of the OHPETPendingUTXOEvents. Consequently, the user can obtain the following information about the pending UTXO: the sender's public key, the recipient's public key, the tokenValue, and the noncePending. The user can save this obtained information for future use when they need to spend/consume this pending UTXO.

At step 1106, the user checks and reads all the OHPET-ConfirmedUTXOEvents from the smart contract data object 102.

At step 1108, since the contents of the OHPETConfirmedUTXOEvents are encrypted using the owner's public key, the user can attempt to decrypt the contents of the OHPETConfirmedUTXOEvents using the user's own private key. If the decryption is successful, then the user must be the owner of the OHPETConfirmedUTXOEvents. Consequently, the user can obtain the following information about the confirmed UTXO: the tokenValue and the nonceConfirmed. The user can save this information for future use when they need to consume this confirmed UTXO.

Embodiments described herein have similar gas fee costs as other similar PET solutions. For gas costs payments, different approaches can be taken to handle the processing fee costs, and these can include paying privacy tokens to a third party minter service, or in other embodiments, the smart contract may be coupled to a gas repository that the transacting parties have paid into.

Use cases for private transactions can include transactions relating to large value objects, such as houses, cars, etc., where the parties are willing to incur the additional gas costs to obfuscate the transaction from third parties but still allow the auditor to retain the capability to decrypt as required.

Further variations can include blockchain or digital decentralized currency examples where, for example, some transactions can be designated semi-private transactions as between parties. In other variations, it is possible to have a digital decentralized currency implementation where every single transaction requires the encryption as described herein.

Another variation can be used for cross-chain implementation, where the smart contract acts as an intermediary as well between different blockchains or different types of objects minted by different institutions that exist on a blockchain.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises,"

"has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have-any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a processor, a digital signal processor (DSP), an ASIC), a field programmable gate array (FPGA) or other programmable logic device, discrete gate or transistor logic, discrete hardware components, or combinations thereof designed to perform the functions described herein. A processor may be a microprocessor, but in the alternative, the processor may be another form of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a computer, or a processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computing system for processing private blockchain distributed ledger based transactions using two unspent transaction output (UTXO) merkle tree data structures, the system comprising:

a computer processor coupled with computer memory and a non-transitory computer readable storage medium, the computer processor configured to:

persist a smart contract data object comprising a pending UTXO merkle tree data structure and a confirmed UTXO merkle tree data structure;

receive a plurality of tokens from a sender blockchain wallet to be sent to a receiver blockchain wallet;

generate and insert a first plurality of confirmed UTXOs corresponding to the plurality of tokens into the confirmed UTXO merkle tree data structure;

receive a transfer request from the sender blockchain wallet to transfer the plurality of tokens to the receiver blockchain wallet;

verify the transfer request and the sender blockchain wallet using a first confirmed nullifier;

upon successful verification of the transfer request, generate and insert a plurality of pending UTXOs into the pending UTXO merkle tree data structure, record the first confirmed nullifier in the smart contract data object, and burn the first plurality of confirmed UTXOs from the confirmed UTXO merkle tree data structure, wherein the plurality of pending UTXOs are encrypted using public keys associated with the sender blockchain wallet and the receiver blockchain wallet;

receive an extraction request from an owner to extract the plurality of pending UTXOs, wherein the owner is one of the sender blockchain wallet and the receiver blockchain wallet;

verify the extraction request and the owner using a pending nullifier;

upon successful verification of the extraction request, extract the plurality of pending UTXOs from the pending UTXO merkle tree data structure, generate a second plurality of confirmed UTXOs in the confirmed UTXO merkle tree data structure, and record the pending nullifier in the smart contract data object;

receive a withdrawal request from the owner to withdraw the plurality of tokens;

verify the withdrawal request using a second confirmed nullifier; and upon successful verification of the withdrawal request, transmit the plurality of tokens to the owner, record the second confirmed nullifier in the smart contract data object and burn the second plurality of confirmed UTXOs from the confirmed UTXO merkle tree data structure.

2. The computing system of claim 1, wherein the pending nullifier is generated using a hash function of a pending nonce, a Elliptic-curve Diffie-Hellman (ECDH) shared secret, and the value of the plurality of tokens.

3. The computing system of claim 1, wherein the first and second confirmed nullifiers are generated using a hash function of a confirmed nonce, a private key of the owner, and the value of the plurality of tokens.

4. The computing system of claim 1, wherein the transfer request is verified using zero-knowledge proof and a Circom circuit to prove that the first plurality of confirmed UTXOs exist in the confirmed UTXO merkle tree data structure, the first confirmed nullifier is mapped to the first plurality of confirmed UTXOs, the first confirmed nullifier has not been recorded in the smart contract data object, the plurality of pending UTXOs do not exist in the pending UTXO merkle tree data structure, and the first plurality of confirmed UTXOs and the plurality of pending UTXOs correspond to the same token value.

5. The computing system of claim 1, wherein the extraction request is verified using zero-knowledge proof and a Circom circuit to prove that the plurality of pending UTXOs exist in the pending UTXO merkle tree data structure, the pending nullifier is mapped to the plurality of pending UTXOs, the pending nullifier has not been recorded in the smart contract data object, the second plurality of confirmed UTXOs do not exist in the confirmed UTXO merkle tree data structure, and the plurality of pending UTXOs and the second plurality of confirmed UTXOs correspond to the same token value.

6. The computing system of claim 1, wherein the withdrawal request is verified by using zero-knowledge proof and a Circom circuit to prove that the second plurality of confirmed UTXOs exist in the confirmed UTXO merkle tree data structure, the second confirmed nullifier is mapped to the second plurality of confirmed UTXOs, and the second confirmed nullifier has not been recorded in the smart contract data object.

7. The computing system of claim 1, wherein the smart contract data object further comprises an event bus that can be queried by the receiver blockchain wallet to check for pending UTXOs in the pending UTXO merkle tree data structure that are assigned to the receiver blockchain wallet.

8. The computing system of claim 7, wherein the processor is further configured to:

set an expiration time limit; and upon the expiration time limit lapsing, automatically extract the plurality of pending UTXOs from the pending UTXO merkle tree data structure and return the plurality of tokens to the sender blockchain wallet, wherein the plurality of pending UTXOs have not been extracted within the expiration time limit.

9. The computing system of claim 1, wherein the receiver blockchain wallet is a custodial wallet that can be accessed by a plurality of entities to extract and consume the plurality of pending UTXOs in the pending UTXO merkle tree data structure and the second plurality of confirmed UTXOs in the confirmed UTXO merkle tree data structure, wherein the plurality of entities can simultaneously access the custodial wallet through access control.

10. The computing system of claim 4, wherein the processor is further configured to:

upon successful verification of the transfer request, generate a UTXO designated for the sender blockchain wallet as change.

11. The computing method for processing private blockchain distributed ledger based transactions using two unspent transaction output (UTXO) merkle tree data structures, the method comprising:

persisting a smart contract data object comprising a pending UTXO merkle tree data structure and a confirmed UTXO merkle tree data structure;

receiving a plurality of tokens from a sender blockchain wallet to be sent to a receiver blockchain wallet;

generating and inserting a first plurality of confirmed UTXOs corresponding to the plurality of tokens into the confirmed UTXO merkle tree data structure;

receiving a transfer request from the sender blockchain wallet to transfer the plurality of tokens to the receiver blockchain wallet;

verifying the transfer request and the sender blockchain wallet using a first confirmed nullifier;

upon successful verification of the transfer request, generating and inserting a plurality of pending UTXOs into the pending UTXO merkle tree data structure, recording the first confirmed nullifier in the smart contract data object, and burning the first plurality of confirmed UTXOs from the confirmed UTXO merkle tree data structure, wherein the plurality of pending UTXOs are encrypted using public keys associated with the sender blockchain wallet and the receiver blockchain wallet;

receiving an extraction request from an owner to extract the plurality of pending UTXOs, wherein the owner is one of the sender blockchain wallet and the receiver blockchain wallet;

verifying the extraction request and the owner using a pending nullifier;

upon successful verification of the extraction request, extracting the plurality of pending UTXOs from the pending UTXO merkle tree data structure, generating a second plurality of confirmed UTXOs in the confirmed UTXO merkle tree data structure, and recording the pending nullifier in the smart contract data object;

receiving a withdrawal request from the owner to withdraw the plurality of tokens;

verifying the withdrawal request using a second confirmed nullifier; and upon successful verification of the withdrawal request, transmitting the plurality of tokens to the owner, recording the second confirmed nullifier in the smart contract data object and burning the second plurality of confirmed UTXOs from the confirmed UTXO merkle tree data structure.

12. The computing method of claim 11, wherein the pending nullifier is generated using a hash function of a pending nonce, a Elliptic-curve Diffie-Hellman (ECDH) shared secret, and the value of the plurality of tokens.

13. The computing method of claim 11, wherein the first and second confirmed nullifiers are generated using a hash function of a confirmed nonce, a private key of the owner, and the value of the plurality of tokens.

14. The computing method of claim 11, wherein verifying the transfer request comprises using zero-knowledge proof and a Circom circuit to prove that the first plurality of confirmed UTXOs exist in the confirmed UTXO merkle tree data structure, the first confirmed nullifier is mapped to the first plurality of confirmed UTXOs, the first confirmed nullifier has not been recorded in the smart contract data object, the plurality of pending UTXOs do not exist in the pending UTXO merkle tree data structure, and the first plurality of confirmed UTXOs and the plurality of pending UTXOs correspond to the same token value.

15. The computing method of claim 11, wherein verifying the extraction request comprises using zero-knowledge proof and a Circom circuit to prove that the plurality of pending UTXOs exist in the pending UTXO merkle tree data structure, the pending nullifier is mapped to the plurality of pending UTXOs, the pending nullifier has not been recorded in the smart contract data object, the second plurality of confirmed UTXOs do not exist in the confirmed UTXO merkle tree data structure, and the plurality of pending UTXOs and the second plurality of confirmed UTXOs correspond to the same token value.

16. The computing method of claim 11, wherein verifying the withdrawal request comprises using zero-knowledge proof and a Circom circuit to prove that the second plurality of confirmed UTXOs exist in the confirmed UTXO merkle tree data structure, the second confirmed nullifier is mapped to the second plurality of confirmed UTXOs, and the second confirmed nullifier has not been recorded in the smart contract data object.

17. The computing method of claim 11, wherein the smart contract data object further comprises an event bus that can be queried by the receiver blockchain wallet to check for pending UTXOs in the pending UTXO merkle tree data structure that are assigned to the receiver blockchain wallet.

18. The computing method of claim 17, wherein the method further comprises:

setting an expiration time limit; and upon the expiration time limit lapsing, automatically extracting the plurality of pending UTXOs from the pending UTXO merkle tree data structure and returning the plurality of tokens to the sender blockchain wallet, wherein the plurality of pending UTXOs have not been extracted within the expiration time limit.

19. The computing method of claim 11, wherein the receiver blockchain wallet is a custodial wallet that can be accessed by a plurality of entities to extract and consume the plurality of pending UTXOs in the pending UTXO merkle tree data structure and the second plurality of confirmed UTXOs in the confirmed UTXO merkle tree data structure, wherein the plurality of entities can simultaneously access the custodial wallet through access control.

20. A non-transitory computer readable medium storing computer interpretable instructions, which when executed by a computer processor, cause the computer processor to perform a method for processing private blockchain distributed ledger based transactions using two unspent transaction output (UTXO) merkle tree data structures, the method comprising:

persisting a smart contract data object comprising a pending UTXO merkle tree data structure and a confirmed UTXO merkle tree data structure;

receiving a plurality of tokens from a sender blockchain wallet to be sent to a receiver blockchain wallet;

generating and inserting a first plurality of confirmed UTXOs corresponding to the plurality of tokens into the confirmed UTXO merkle tree data structure;

receiving a transfer request from the sender blockchain wallet to transfer the plurality of tokens to the receiver blockchain wallet;

verifying the transfer request and the sender blockchain wallet using a first confirmed nullifier;

upon successful verification of the transfer request, generating and inserting a plurality of pending UTXOs into the pending UTXO merkle tree data structure, recording the first confirmed nullifier in the smart contract data object, and burning the first plurality of confirmed UTXOs from the confirmed UTXO merkle tree data structure, wherein the plurality of pending UTXOs are encrypted using public keys associated with the sender blockchain wallet and the receiver blockchain wallet;

receiving an extraction request from an owner to extract the plurality of pending UTXOs, wherein the owner is one of the sender blockchain wallet and the receiver blockchain wallet;

verifying the extraction request and the owner using a pending nullifier;

upon successful verification of the extraction request, extracting the plurality of pending UTXOs from the pending UTXO merkle tree data structure, generating a second plurality of confirmed UTXOs in the confirmed UTXO merkle tree data structure, and recording the pending nullifier in the smart contract data object;

receiving a withdrawal request from the owner to withdraw the plurality of tokens;

verifying the withdrawal request using a second confirmed nullifier; and upon successful verification of the withdrawal request, transmitting the plurality of tokens to the owner, recording the second confirmed nullifier in the smart contract data object and burning the second plurality of confirmed UTXOs from the confirmed UTXO merkle tree data structure.

\* \* \* \* \*